(12) United States Patent
Adebar et al.

(10) Patent No.: US 12,502,223 B2
(45) Date of Patent: Dec. 23, 2025

(54) SYSTEMS AND METHODS FOR UPDATING A TARGET LOCATION USING INTRAOPERATIVE IMAGE DATA

(71) Applicant: INTUITIVE SURGICAL OPERATIONS, INC., Sunnyvale, CA (US)

(72) Inventors: Troy K. Adebar, San Jose, CA (US); George Korir, Palo Alto, CA (US); Benjamin G. Cohn, Oakhurst, CA (US); Ruchi C. Bhatt, San Jose, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 107 days.

(21) Appl. No.: 18/260,034

(22) PCT Filed: Dec. 28, 2021

(86) PCT No.: PCT/US2021/065277
§ 371 (c)(1),
(2) Date: Jun. 29, 2023

(87) PCT Pub. No.: WO2022/146962
PCT Pub. Date: Jul. 7, 2022

(65) Prior Publication Data
US 2024/0050154 A1 Feb. 15, 2024

Related U.S. Application Data

(60) Provisional application No. 63/133,112, filed on Dec. 31, 2020.

(51) Int. Cl.
*A61B 34/10* (2016.01)
*A61B 34/00* (2016.01)
(Continued)

(52) U.S. Cl.
CPC .............. *A61B 34/10* (2016.02); *A61B 34/25* (2016.02); *A61B 34/30* (2016.02); *A61B 90/361* (2016.02);
(Continued)

(58) Field of Classification Search
CPC .......... A61B 1/00147; A61B 2010/045; A61B 2017/00809; A61B 2034/107;
(Continued)

(56) References Cited

U.S. PATENT DOCUMENTS

2019/0247127 A1 8/2019 Kopel et al.
2020/0078103 A1 3/2020 Duindam et al.

FOREIGN PATENT DOCUMENTS

WO WO-2018195216 A1 10/2018

OTHER PUBLICATIONS

International Search Report and Written Opinion for Application No. PCT/US2021/065277, mailed Jun. 24, 2022, 22 pages.
(Continued)

*Primary Examiner* — Mark D Remaly
(74) *Attorney, Agent, or Firm* — Haynes & Boone, LLP.

(57) ABSTRACT

A medical system comprises a display system, an elongate device, an imaging probe configured to extend within the elongate device, and a control system communicatively coupled to the display system. The control system is configured to display a graphical user interface via the display system. The graphical user interface includes a virtual navigation view. The control system is further configured to receive imaging data from the imaging probe. The control system is further configured to determine a target location based on the imaging data. The control system is further configured to determine a position of a distal end of the elongate device. The control system is further configured to display a graphical marker in the virtual navigation view
(Continued)

indicating a direction to steer the elongate device from the position of the distal end of the elongate device to the target location.

20 Claims, 30 Drawing Sheets

(51) Int. Cl.
*A61B 34/30* (2016.01)
*A61B 90/00* (2016.01)
*A61B 34/20* (2016.01)

(52) U.S. Cl.
CPC . *A61B 2034/107* (2016.02); *A61B 2034/2055* (2016.02); *A61B 2034/2065* (2016.02); *A61B 2034/2074* (2016.02); *A61B 2034/301* (2016.02)

(58) Field of Classification Search
CPC .... A61B 2034/2055; A61B 2034/2061; A61B 2034/2065; A61B 2034/2074; A61B 2034/254; A61B 2034/301; A61B 34/10; A61B 34/20; A61B 34/25; A61B 34/30; A61B 90/361
See application file for complete search history.

(56) References Cited

OTHER PUBLICATIONS

International Preliminary Report on Patentability for Application No. PCT/US2021/065277 mailed Jul. 13, 2023, 14 pages.
Invitation to Pay Additional Fees and Partial International Search Report for PCT/US2021/065277, mailed May 2, 2022, 16 pages.
Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

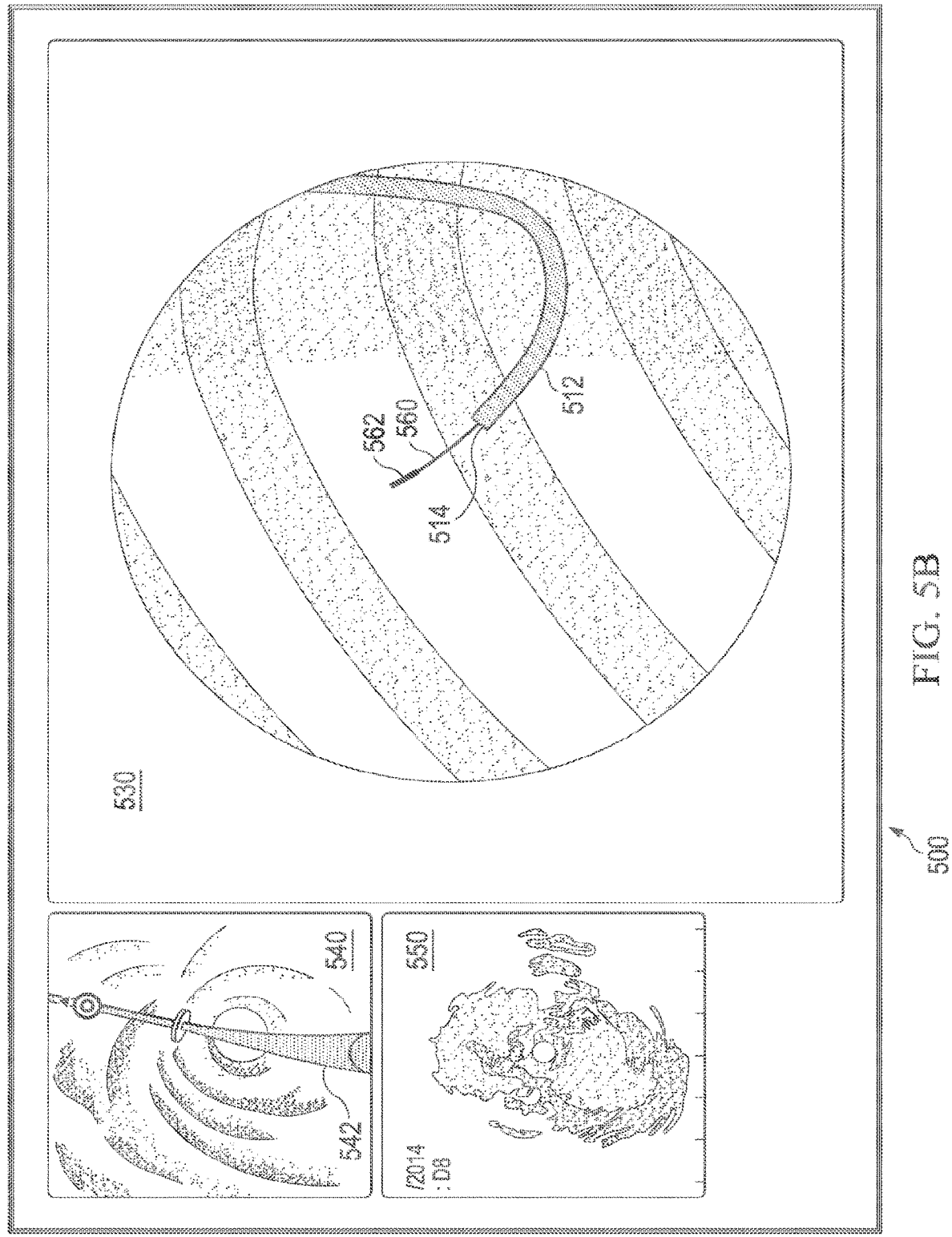

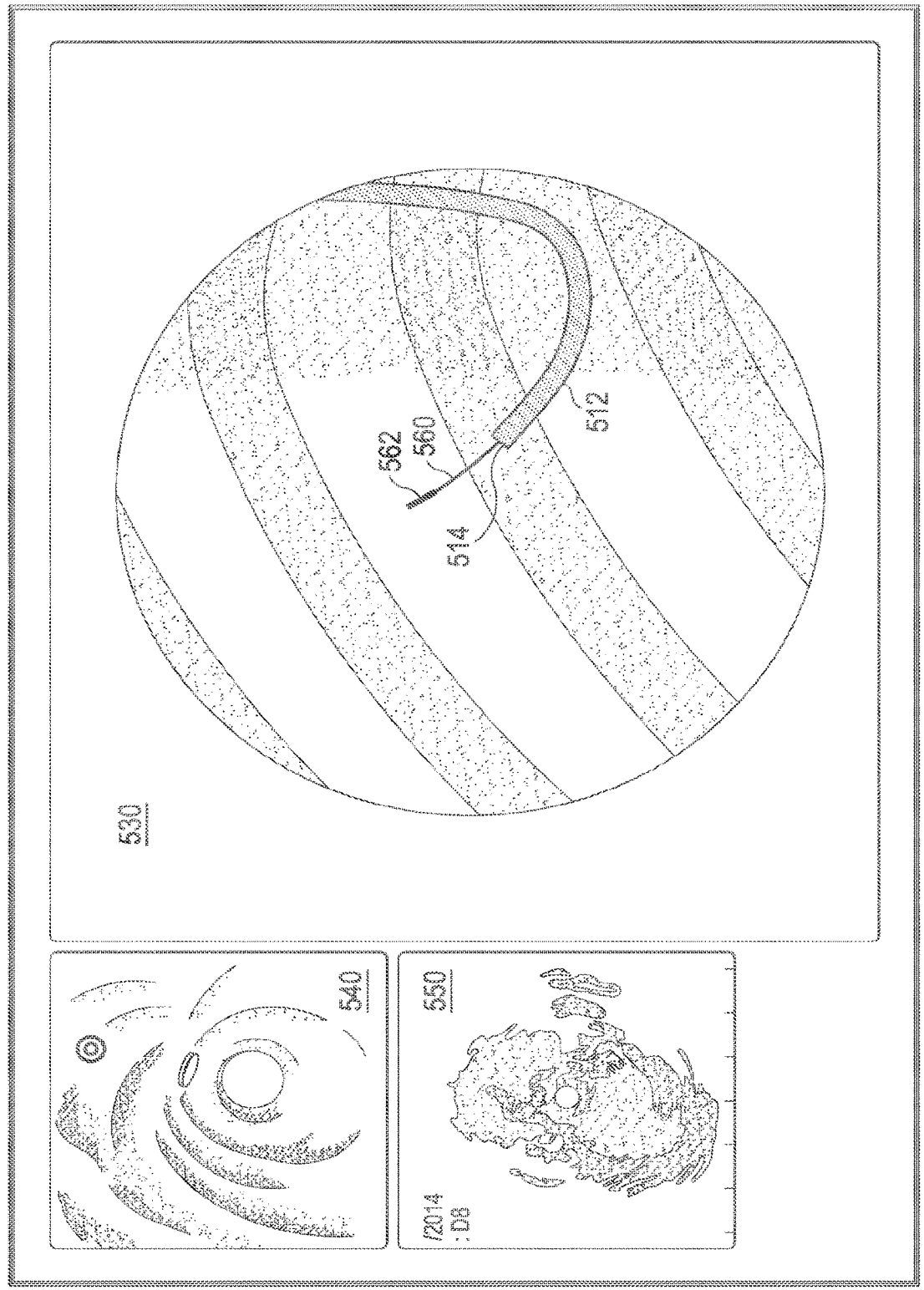

SYSTEMS AND METHODS FOR UPDATING A TARGET LOCATION USING INTRAOPERATIVE IMAGE DATA

CROSS-REFERENCE TO RELATED APPLICATIONS

This patent application is the U.S. national phase of International Application No. PCT/US2021/065277, filed Dec. 28, 2021, which claims priority to and the benefit of U.S. Provisional Application No. 63/133,112, filed Dec. 31, 2020, each of which is incorporated by reference herein in its entirety.

FIELD

Examples described herein relate to systems and methods for updating a target location using intraoperative image data, such as systems and methods for receiving intraoperative image data from an imaging probe and updating a location of an anatomic target based on the intraoperative image data during a medical procedure.

BACKGROUND

Minimally invasive medical techniques are intended to reduce the amount of tissue that is damaged during medical procedures, thereby reducing patient recovery time, discomfort, and harmful side effects. Such minimally invasive techniques may be performed through natural orifices in a patient anatomy or through one or more surgical incisions. Through these natural orifices or incisions, an operator may insert minimally invasive medical tools to reach a target tissue location. Minimally invasive medical tools include instruments such as therapeutic, diagnostic, biopsy, and surgical instruments. Minimally invasive medical tools may also include imaging instruments such as endoscopic instruments. Imaging instruments provide a user with a field of view within the patient anatomy. Some minimally invasive medical tools and imaging instruments may be teleoperated or otherwise computer-assisted. These tools and instruments may be registered to image data of the patient anatomy to improve performance.

SUMMARY

The following presents a simplified summary of various examples described herein and is not intended to identify key or critical elements or to delineate the scope of the claims.

Consistent with some examples a medical system is provided. The medical system includes a display system, an elongate device, and an imaging probe configured to extend within the elongate device. The medical system further includes a control system communicatively coupled to the display system. The control system is configured to display a graphical user interface via the display system, and the graphical user interface includes a virtual navigation view. The control system is further configured to receive imaging data from the imaging probe. The control system is further configured to determine a target location based on the imaging data. The control system is further configured to determine a position of a distal end of the elongate device. The control system is further configured to display a graphical marker in the virtual navigation view indicating a direction to steer the elongate device from the position of the distal end of the elongate device to the target location.

Consistent with some examples, a medical system is provided. The medical system includes a display system, an elongate device configured to be inserted in an anatomical passageway of a patient anatomy, and an imaging probe configured to extend within the elongate device. The medical system further includes a control system communicatively coupled to the display system. The control system is configured to display a graphical user interface via the display system, and the graphical user interface includes a virtual navigation view. The control system is further configured to determine a position and an orientation of an imaging probe marker in the virtual navigation view. The control system is further configured to display a zone indicator in the virtual navigation view, and the zone indicator divides the imaging probe marker into a plurality of segments. The control system is further configured to determine a first segment of the plurality of segments through which a biopsy occurred. The control system is further configured to display a graphical marker within the first segment where the biopsy occurred.

Consistent with some examples, a medical system is provided. The medical system includes a display system, an elongate device configured to extend within a patient anatomy, and an imaging probe configured to extend within the elongate device. The medical system further includes a control system communicatively coupled to the display system. The control system is configured to register the elongate device with a patient coordinate system. The control system is further configured to generate a model of the patient anatomy, and the model includes a model coordinate system. The control system is further configured to register the model of the patient anatomy to the patient coordinate system. The control system is further configured to determine a location of an anatomical target in the model coordinate system based on preoperative image data. The control system is further configured to receive imaging data from the imaging probe at a first location of the anatomical target in the patient coordinate system. The control system is further configured to re-register the model to the patient coordinate system based on the imaging data.

Consistent with some examples, a medical system is provided. The medical system includes an elongate device, an imaging probe configured to extend within the elongate device, and a control system. The control system is configured to determine that a target location is positioned at a bifurcation between a first anatomical passageway and a second anatomical passageway of a patient anatomy. The control system is further configured to receive first imaging data from the imaging probe when the imaging probe is positioned within the first anatomical passageway. The first imaging data includes a first image of an anatomical target at the target location. The control system is further configured to receive second imaging data from the imaging probe when the imaging probe is positioned within the second anatomical passageway. The second imaging data includes a second image of the anatomical target at the target location. The control system is further configured to determine that the first imaging data was received when the imaging probe was positioned in the first anatomical passageway and that the second imaging data was received when the imaging probe was positioned in the second anatomical passageway.

Consistent with some examples, a medical system is provided. The medical system includes a display system, an elongate device configured to extend within an anatomical passageway of a patient anatomy, and an imaging probe configured to extend within the elongate device. The medical system further includes a control system communicatively coupled to the display system. The control system is configured to display a graphical user interface via the display system, and the graphical user interface including a virtual navigation view. The control system is further configured to display an image of the elongate device in the virtual navigation view. The control system is further configured to receive first imaging data from the imaging probe when the elongate device is in a first orientation. The first imaging data includes a first image of an anatomical target. The control system is further configured to receive second imaging data from the imaging probe when the elongate device is in a second orientation. The second imaging data includes a second image of the anatomical target. The control system is further configured to adjust a preoperative target location based on the first and second imaging data.

Other embodiments include corresponding computer systems, apparatus, and computer programs recorded on one or more computer storage devices, each configured to perform the actions of the methods.

It is to be understood that both the foregoing general description and the following detailed description are illustrative and explanatory in nature and are intended to provide an understanding of the various examples described herein without limiting the scope of the various examples described herein. In that regard, additional aspects, features, and advantages of the various examples described herein will be apparent to one skilled in the art from the following detailed description.

BRIEF DESCRIPTIONS OF THE DRAWINGS

FIGS. 5A-5C illustrate a graphical user interface displaying a virtual navigation view according to some examples.

FIGS. 6A-6C illustrate a graphical user interface for adjusting a position of a virtual elongate device in a virtual navigation view according to some examples.

Figure 1:
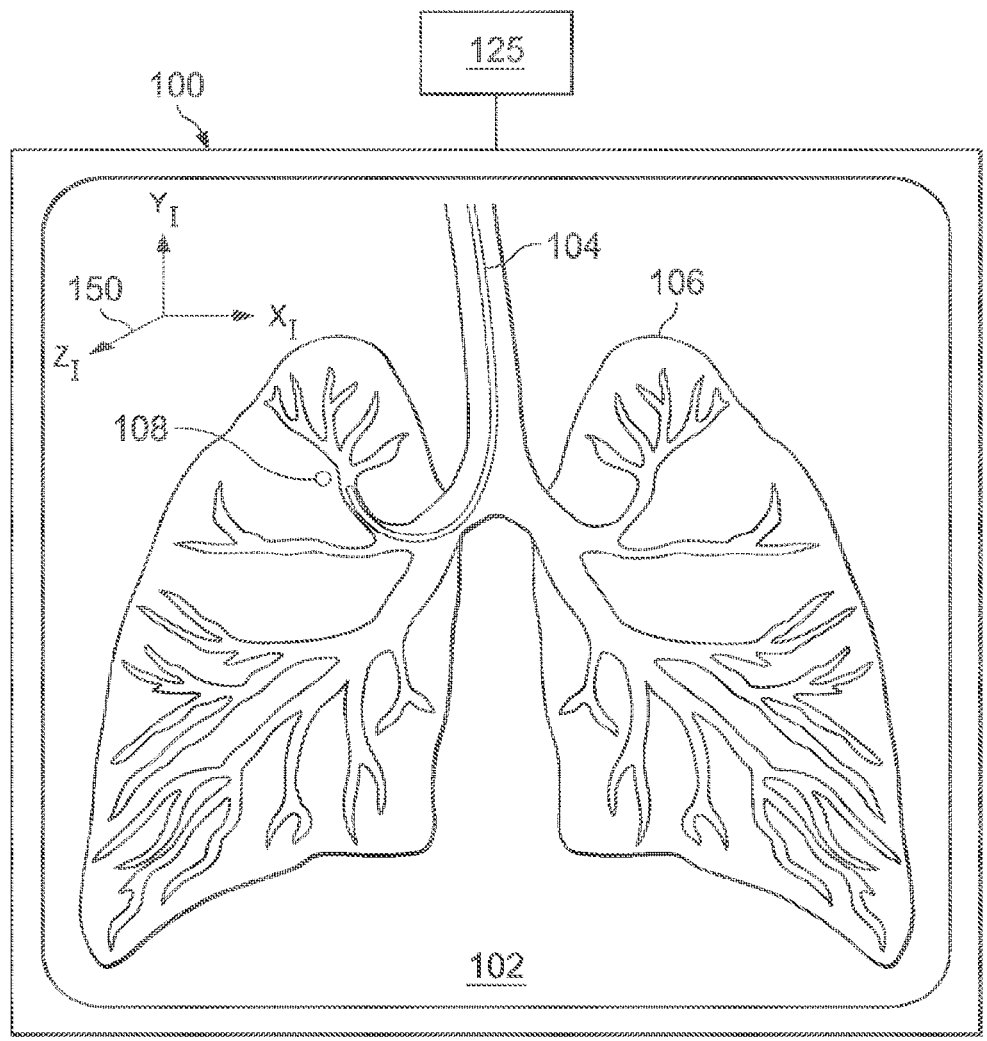
FIG. 1 illustrates an image of a medical instrument registered to an anatomic model according to some examples.

Various examples described herein and their advantages are described in the detailed description that follows. It should be appreciated that like reference numerals are used to identify like elements illustrated in one or more of the figures for purposes of illustrating but not limiting the various examples described herein.

DETAILED DESCRIPTION

The techniques disclosed in this document may be used to enhance the workflow processes of minimally invasive procedures using intraoperative imaging, such as radial endobronchial ultrasound (REBUS), endobronchial ultrasound (EBUS), and/or fluoroscopic imaging. In some examples, the image data produced by one or more of the intraoperative imaging devices may be utilized to refine locations of an instrument, an anatomic structure, and/or a target in a model constructed from preoperative imaging.

With reference to FIG. 1, an image-guided medical procedure, which may be robot-assisted or otherwise teleoperated, may be conducted in which a display system 100 may display a virtual navigation image 102, which includes an image reference frame $(X_I, Y_I, Z_I)$ 150. An elongate device, such as a medical instrument 104, is registered (e.g., dynamically referenced) with an anatomic model 106 of a patient derived from pre-operative image data obtained, for example, from a computerized tomography (CT) scan. The anatomic model 106 may include a target 108, such as a lesion or nodule of interest, which the procedure is intended to address (e.g., biopsy, treat, view, etc.). In some examples, the virtual navigation image 102 may present a physician with a virtual image of the internal surgical site from a viewpoint of the medical instrument 104, such as from a distal tip of the medical instrument 104. In some examples, the display system 100 may present a real-time view from the distal tip of the medical instrument 104, such as when the medical instrument 104 includes an endoscope. In some examples, the medical instrument 104 may be manipulated by a robot-assisted manipulator controlled by a control system 125, or processing system, which includes one or more processors. An example of a robot-assisted medical system will be described further at FIG. 13. In some examples, an imaging probe may extend through a lumen of the medical instrument 104.

Generating the virtual navigation image 102 involves the registration of the image reference frame $(X_I, Y_I, Z_I)$ 150 to a surgical reference frame $(X_S, Y_S, Z_S)$ of the anatomy and/or a medical instrument reference frame $(X_M, Y_M, Z_M)$ of the medical instrument 104. This registration may rotate, translate, or otherwise manipulate by rigid or non-rigid transforms points associated with the segmented instrument shape from the image data and/or points associated with the shape data from a shape sensor disposed along a length of the medical instrument 104. This registration between the image and instrument reference frames may be achieved, for example, by using a point-based iterative closest point (ICP) technique as described in International Patent App. No. PCT/US2016/046633, filed on Aug. 11, 2016, entitled "Systems and Methods of Registration for Image-Guided Surgery" and in International Patent App. No. PCI/US2016/046636, filed on Aug. 11, 2016, entitled "Systems and Methods of Registration for Image-Guided Surgery," which are incorporated by reference herein in their entireties. The registration may be achieved additionally or alternatively by another point cloud registration technique. In some examples, the medical instrument reference frame ($X_M$, $Y_M$, $Z_M$) may be registered to the surgical reference frame ($X_S$, $Y_S$, $Z_S$).

Figure 2:
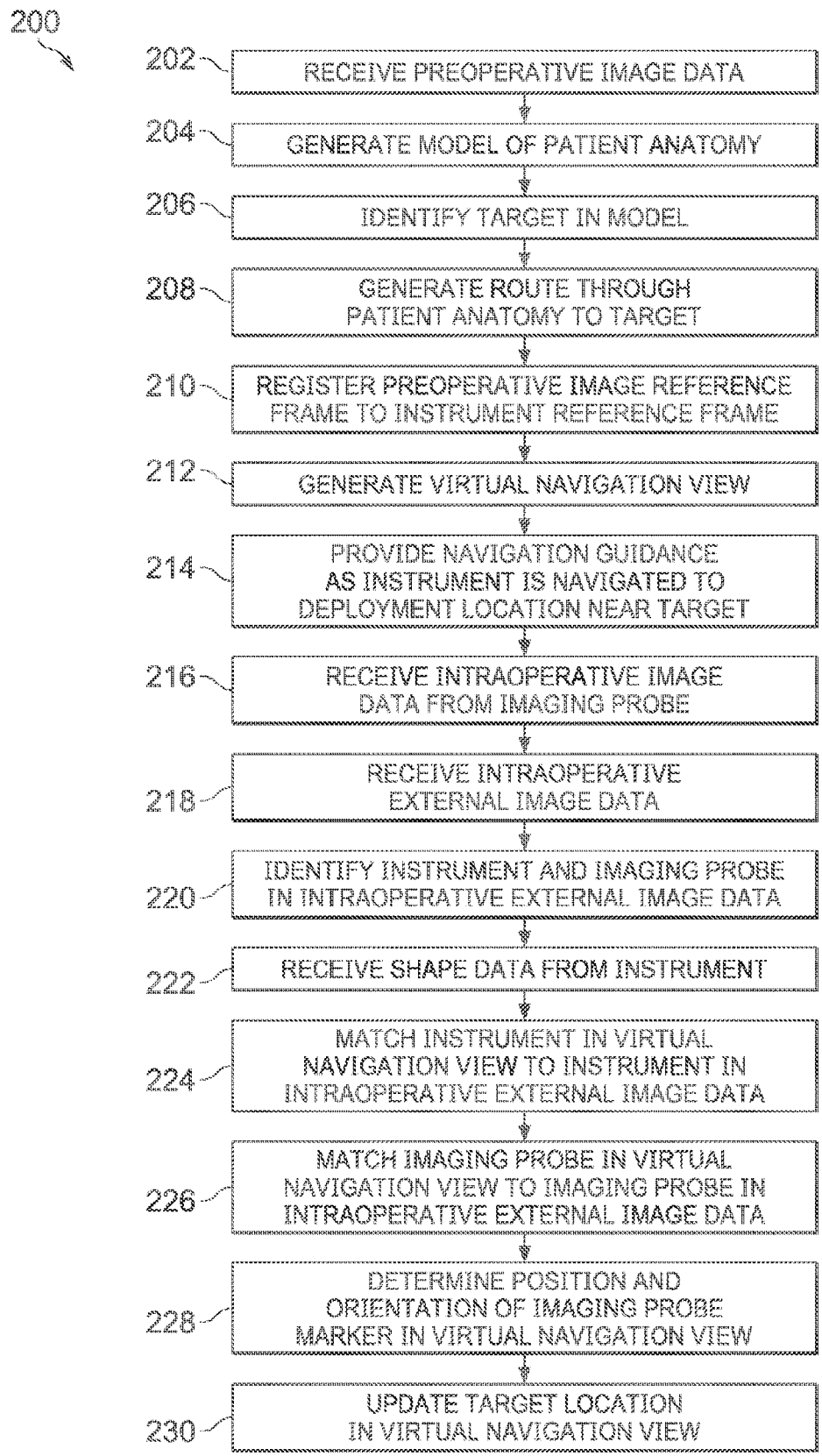
FIG. 2 illustrates a method for updating a location of a target in an anatomic model according to some examples.

FIG. 2 illustrates a method 200 for updating a location of a target in an anatomic model according to some examples. For example, updating the location of the target may generally include updating the location based on intraoperative external image data. One or more of the method steps may be performed on the same robotic-assisted medical system used to perform a biopsy or other medical procedure.

Figure 5A:
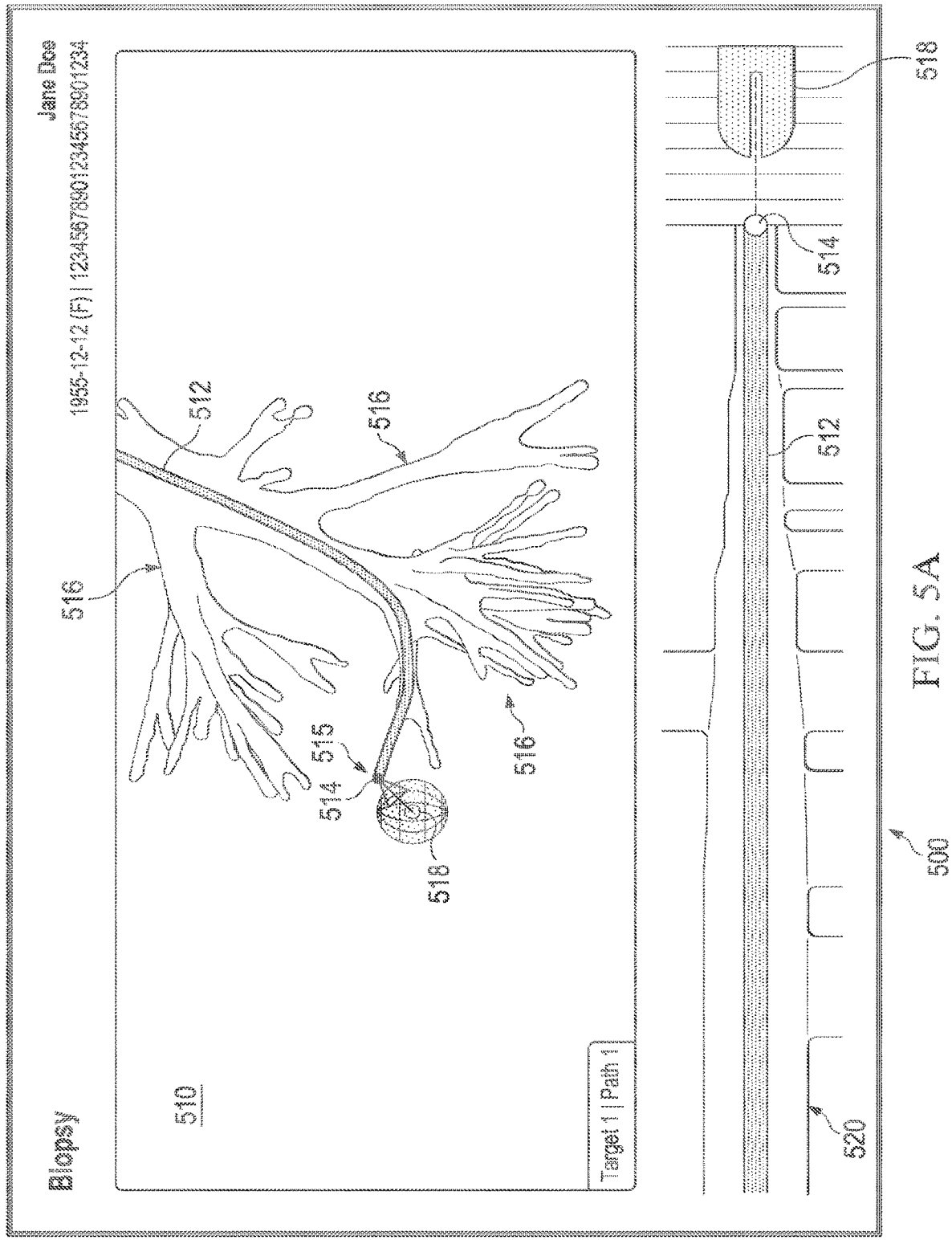

The method 200 is illustrated as a set of operations or processes 202 through 228 and is described with continuing reference to FIGS. 5A-11C, which illustrate a graphical user interface (GUI) 500 in a navigation mode during the performance of method 200 according to some examples. With reference to FIGS. 5A-5C, the GUI 500 includes a virtual navigation view 510. The virtual navigation view 510 may illustrate a medical instrument 512 (e.g., the medical instrument 104 of FIG. 1), one or more anatomic passageways 516, and an anatomical target 518 (e.g., the target 108 of FIG. 1). The virtual navigation view 510 may be generated by registering preoperative image data (and a subsequently constructed 3D model) to a current location of the medical instrument 512. The GUI 500 may also include a reduced anatomical model 520, an intraoperative external image 530, a virtual path view 540, an intraoperative image 550, and an icon menu 570. The path view 540 may illustrate the view from along a preoperatively planned traversal path 542 for the medical instrument 512 to follow through the anatomic passageways 516 identified in an anatomic model generated from preoperative image data (e.g., CT image data). The path view 540 may provide an interior view (e.g., a pseudo-endoscopic view) of one or more of the anatomic passageways 516 as the medical instrument 512 navigates the anatomic passageways 516 and may also selectively depict structures outside of the passageway walls, such as the target location, vasculature, pleura, or other anatomical structures. Further details of the GUI 500 will be described below and are described in the U.S. Provisional patent application, filed on Dec. 31, 2020, entitled "Systems and Methods for Updating a Target Location Using Intraoperative Image Data," which is incorporated by reference herein in its entirety.

Figure 5C:
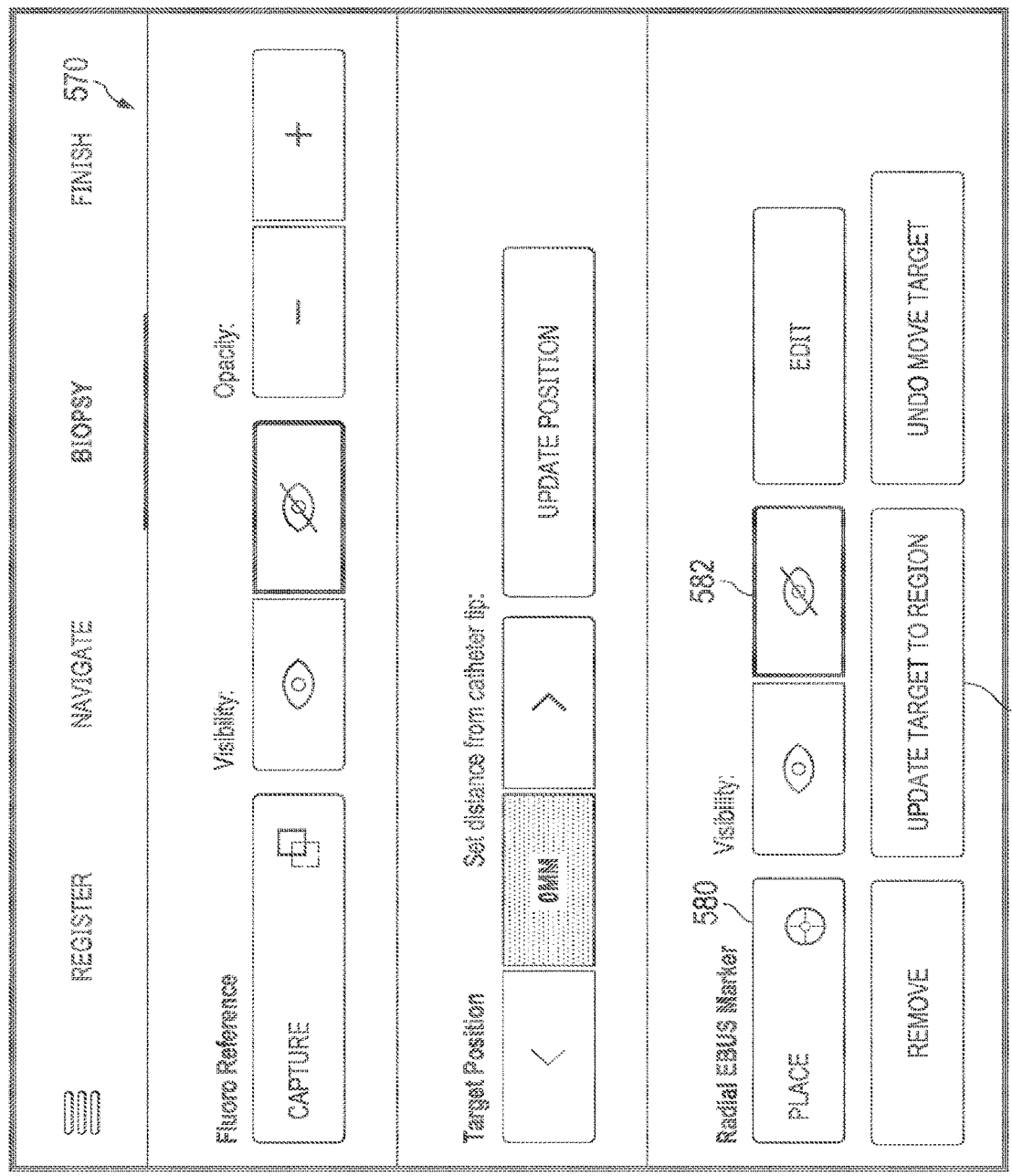

As shown in FIG. 5A, a distal end 514 of the medical instrument 512 may be navigated to a location near the anatomical target 518. The current shape of the distal end of the medical instrument 512 and the location of the distal end 514 may be displayed in the virtual navigation view 510. The medical instrument 512 may be navigated by a user, a teleoperational control system (e.g., the control system 125), or a combination of manual and automatic inputs. Although illustrative arrangements of views are depicted in FIGS. 5A-5C, it is to be understood that the GUI 500 may display any number of views, in any arrangement, and/or on any number of screens. In some examples, the number of concurrently displayed views may be varied by opening and closing views, minimizing and maximizing views, moving views between a foreground and a background of the GUI 500, switching between screens, and/or otherwise fully or partially obscuring views. Similarly, the arrangement of the views—including their size, shape, orientation, ordering (in a case of overlapping views), and/or the like—may vary and/or may be user-configurable.

Figure 5E:
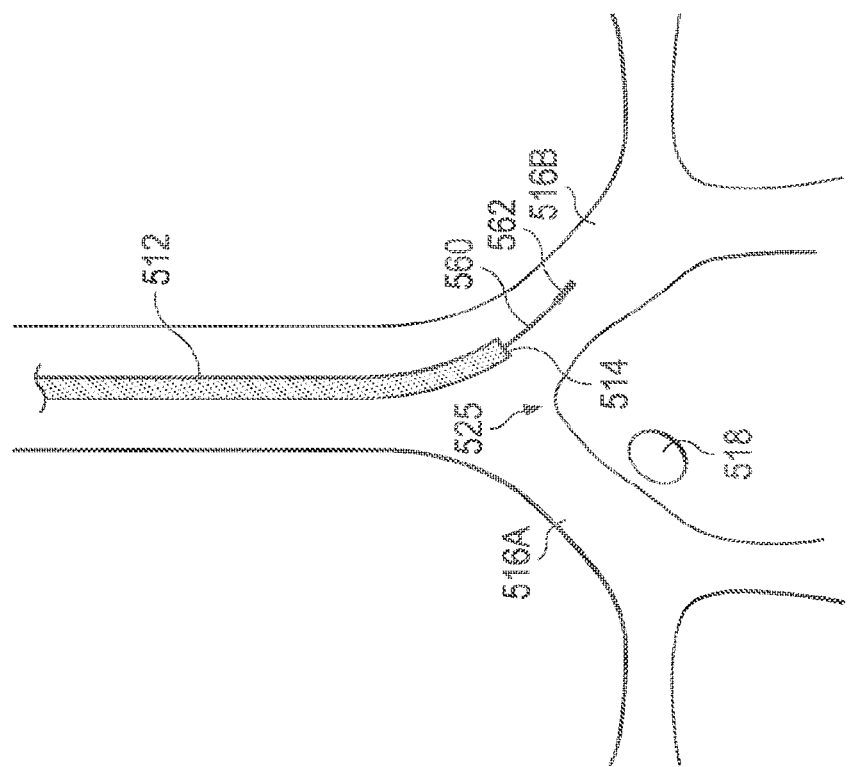
FIGS. 5D and 5E illustrate an anatomical target located near a bifurcation of a patient anatomy according to some examples.
Figure 5D:
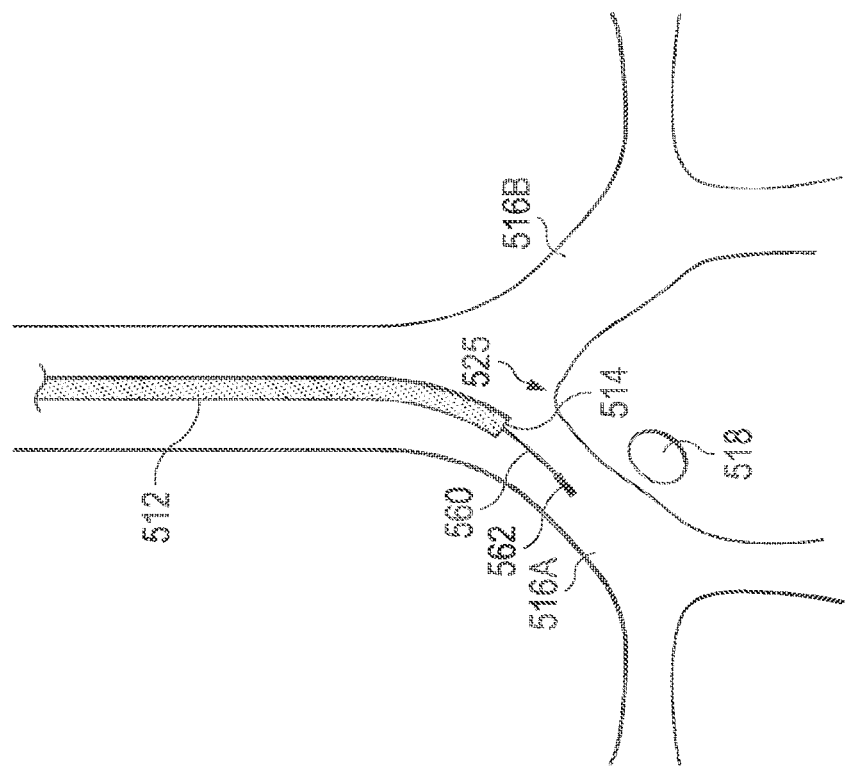

At a process 202, preoperative image data is received at a control system (e.g., the control system 125). For example, a CT scan of patient anatomy may be performed with a CT scanner, and the CT image data may be received by the control system. Alternatively, preoperative image data may be received from other types of imaging systems including magnetic resonance imaging (MRI) systems, fluoroscopy systems, or any other suitable method for obtaining dimensions of anatomic structures. At a process 204, a three-dimensional (3D) model of the anatomic structures (e.g., the anatomic model 106 of FIG. 1) may be constructed from the preoperative image data by the control system. At a process 206, a target may be identified in the 3D model and/or in the preoperative image data from which it was constructed. For example, the target 108 of FIG. 1 may be identified in the anatomic model 106 as a region of interest for investigation and/or treatment. The target may be automatically identified by the control system and confirmed by a user, or the target may be visually identified by the user and manually selected or indicated in the 3D model, for example, via the display system 100. In some examples, as shown in FIGS. 5D and 5E, the target 518 may be located near a bifurcation 525 between an anatomical passageway 516A of the anatomical passageways 516 and an anatomical passageway 516B of the anatomical passageways 516, which will be discussed in greater detail below.

At process 208, a route through anatomic passageways formed in the anatomic structures is generated. The route may be generated automatically by the control system. Additionally or alternatively, the control system may generate the route based on one or more user inputs. In some examples, the route may indicate a path along which the medical instrument 512 may be navigated into close proximity with the target 518. In some examples, the route may be stored in a control system (e.g., in a memory of a control system) and incorporated into the images displayed on the display system 100. The view from the planned path for a current or selected location of the distal end 514 of the medical instrument 512 may be provided as the path view 540. The path view 540 may provide a synthetic view from within the anatomic passageway and may include graphical markers (e.g., lines, arrows, or the like) indicating the path toward a target, such as the target 518. The path view 540 may optionally depict structures such as the target outside the walls of the anatomic passageway that would not be visible with an endoscopic camera positioned within the anatomic passageway.

To provide accurate navigation through the anatomic passageways, the reference frame 150 of the preoperative image data (and subsequently constructed 3D model) may be registered to a reference frame of the medical instrument 104 at a process 210. For example, a shape sensor (e.g., a fiber optic shape sensor and/or one or more position sensors) disposed along a length of the medical instrument 104 may be used to provide real-time shape data (e.g., information regarding a shape of the medical instrument 104 and/or a position of one or more points along the length of the medical instrument 104). This shape data may be utilized to register the medical instrument 104 to the 3D model constructed from the preoperative image data and to track a location of the medical instrument 104 during use. Upon successful registration, a process 212 may include generating a virtual navigation view (e.g., the virtual navigation view 510 of FIG. 5A).

At a process 214, navigation guidance is provided as the medical instrument 104 is navigated through anatomic passageways to a predetermined deployment location in proximity to the target 108. In some examples, as shown in FIG. 5A, the distal end 514 of the medical instrument 512 may be navigated to a deployment location near the anatomical target 518. Navigation may be performed manually by a user with provided navigation guidance, automatically by the control system, or via a combination of both.

At a process 216, the control system may receive intraoperative image data from an imaging probe, such as the imaging probe 560. As shown in FIG. 5B, the imaging probe 560 may be deployed through a lumen of the medical instrument 512. Alternatively, the imaging probe 560 may be inserted into the anatomic passageways 516 independently of the medical instrument 512. The imaging probe 560 includes an imaging device 562 at or near a distal end of the imaging probe 560. In some examples, the imaging probe 560 may be a radial probe or a radial endobronchial ultrasound (radial EBUS or REBUS) probe. The imaging device 562 may be rotated about a longitudinal axis of the imaging probe 560 to allow the imaging device 562 to obtain images in a field of view located near a distal end of the imaging probe 560.

In some examples, the imaging device 562 may be an ultrasound transducer. The imaging device 562 may be coupled to one or more electrical wires or optical fibers for activating the ultrasound transducer, modulating its output, capturing return signals, and/or the like. In some examples, the imaging probe 560 may include side-facing transducers, forward-facing transducers, curved transducers, and/or the like. In some examples, the imaging probe 560 may comprise one or more electronically phased, mechanically scanned, and/or mechanically steerable transducer elements and/or arrays of transducer elements that are capable of capturing 2D, 3D, and/or 4D ultrasound images in proximity to the distal end of the imaging probe 560.

The intraoperative imaging data captured by the imaging probe 560 may be received at a control system and may be received when the imaging probe 560 is extended from the distal end 514 of the medical instrument 512. In some examples, the imaging probe 560 may be deployed when the medical instrument 512 reaches an initial deployment location 515 (FIG. 5A) near the target 518. The intraoperative imaging data received from the imaging probe 560 may be used to confirm and/or refine a deployment location for a tool of the medical instrument 512, such as a biopsy needle, ablation tool, and/or the like. In some examples, the intraoperative imaging data may be displayed on the GUI 500 as an image 550. The image 550 may be an ultrasound image or may be any other type of image depending upon the type of imaging probe that is used (e.g., an electromagnetic imaging probe, a fiber optic imaging probe, an endoscopic imaging probe, and/or the like). In some examples, as shown in FIG. 5B, the image 550 may be a radial endobronchial ultrasound image.

Referring now to FIGS. 5D and 5E, when the target 518 is located near the bifurcation 525, the control system may articulate the distal end 514 of the medical instrument 512 so that the distal end 514 is pointed toward the anatomical passageway 516A. Additionally or alternatively, the control system may receive instructions from a user to articulate the distal end 514 so that the distal end 514 is pointed toward the anatomical passageway 516A. The medical instrument 512 may then be navigated into the anatomical passageway 516A, as shown in FIG. 5D. The imaging probe 560 may then be deployed, and a first set intraoperative imaging data may be received from the imaging probe 560 when the imaging probe 560 is in the anatomical passageway 516A. The first set of intraoperative imaging data may include an image of the target 518. The medical instrument 512 may be retracted from the anatomical passageway 516A to a location proximal of the bifurcation 525. In some examples, the imaging probe 560 may be retracted into the medical instrument 512 before the medical instrument 512 is retracted from the anatomical passageway 516A.

In some examples, the control system may then articulate the distal end 514 of the medical instrument 512 so that the distal end 514 is pointed toward the anatomical passageway 516B. Additionally or alternatively, the control system may receive instructions from a user to articulate the distal end 514 so that the distal end 514 is pointed toward the anatomical passageway 516B. The medical instrument 512 may then be navigated into the anatomical passageway 516B, as shown in FIG. 5E. The imaging probe 560 may then be deployed, and a second set of intraoperative imaging data may be received from the imaging probe 560 when the imaging probe 560 is in the anatomical passageway 516B. The second set of intraoperative imaging data may include another image of the target 518.

Based on the commanded, sensed, and/or kinematically known articulation of the medical instrument 512 and the first set of intraoperative imaging data, the control system may determine that the first set of intraoperative imaging data was obtained when the imaging probe 560 was positioned in the anatomical passageway 516A. Based on the articulation of the medical instrument 512 and the second set of intraoperative imaging data, the control system may also determine that the second set of intraoperative imaging data was obtained when the imaging probe 560 was positioned in the anatomical passageway 516B.

Returning to FIG. 5A, in some examples, the medical instrument 512 may be articulated while the imaging probe 560 is extended from the distal end 514 of the medical instrument 512. The articulation may help refine the location of the target 518. For example, the control system may receive instructions (e.g., via a user input) to articulate the medical instrument 512 within one of the anatomical passageways 516. In some examples, when viewing the anatomical passageway 516 from a distal-looking perspective of the distal end 514 of the medical instrument 512, the medical instrument 512 may be articulated toward a "9:00" (i.e., a nine o'clock) orientation. The medical instrument 512 is in a first orientation when articulated in this manner. The imaging probe 560 may then be deployed. If the imaging probe 560 detects the target 518, then the control system may determine that the target 518 is located at an anatomical position near the distal tip of the imaging probe 560 when the imaging probe is in the "9:00" orientation. With the imaging probe 560 still deployed, the medical instrument 512 may then be articulated toward a "6:00" orientation. The medical instrument 512 is in a second orientation when articulated in this manner. If the imaging probe 560 still detects the target 518, then the control system may determine that the target 518 is located at an anatomical position between the location of the distal tip of the imaging probe 560 when the imaging probe is in the "9:00" orientation and the location of the distal tip of the imaging probe 560 when the imaging probe is in "6:00" orientation of the anatomical passageway 516.

The medical instrument 512 may be articulated so that the distal tip of the imaging probe 560 is angled at various orientations between the "9:00" and "6:00" orientations until the image of the target 518 captured by the imaging probe 560 is the clearest image. In some examples, the image may increase in clarity (e.g., as determined by a viewer evaluation and/or image processing) as the imaging probe 560 moves closer toward the wall of the anatomical passageway 516. Based on an evaluation of the relative clarity of the target 518 in the images, the location of the target 518 may be updated based on the location of the target 518 where the image of the target 518 is the clearest image and based on the known orientation of the imaging probe 560 when the clearest image was recorded. The process of updating the target is discussed in further detail below at least with respect to process 230 of FIG. 2.

If the imaging probe 560 does not detect the target 518 when the medical instrument 512 is articulated to the "6:00" orientation, the medical instrument 512 may be articulated toward a "12:00" orientation. If the imaging probe 560 detects the target 518 at the "12:00" orientation, then the control system may determine that the target 518 is located near the distal tip of the imaging probe 560 when the distal tip is angled between the "9:00" orientation and the "12:00" orientation. The medical instrument 512 may be articulated so that the distal tip of the imaging probe 560 is angled at various orientations between the "9:00" and "12:00" orientations until the image of the target 518 captured by the imaging probe 560 is the clearest image. Based on an evaluation of the relative clarity of the target 518 in the images, the location of the target 518 may be updated based on the location of the target 518 where the image of the target 518 is the clearest image and based on the known orientation of the imaging probe 560 when the clearest image was recorded. The medical instrument 512 may be articulated so that the distal tip of the imaging probe 560 is angled at any orientation until the image of the target 518 captured by the imaging probe 560 is the clearest image.

In some examples, the medical instrument 512 may be articulated prior to the deployment of the imaging probe 560. The articulation of the medical instrument 512 may cause the anatomical passageway 516 to deform. The control system may determine the shape of the medical instrument 512 (e.g., using shape data received from one or more shape sensors of the medical instrument 512). In some examples, an endoscopic imaging device may be positioned within the medical instrument 512 and may capture an image of the anatomical passageway 516 prior to the deployment of the imaging probe 560. The control system may analyze the shape of the medical instrument 512, the image of the anatomical passageway 516, and/or deformation information regarding the deformed shape of the anatomical passageway 516 to determine what the orientation of the imaging probe 560 will be when the imaging probe 560 is fully extended distally from the medical instrument 512. Further details regarding determining the orientation of the imaging probe 560 are discussed below at least with respect to process 228 of FIG. 2.

With the medical instrument 512 positioned at the initial deployment location 515 (e.g., in close proximity to the target 518), an intraoperative external imaging scan may be performed. At a process 218, intraoperative external image data may be received at a control system from an intraoperative external imaging system. In some examples, the intraoperative external imaging system may be a fluoroscopy imaging system than generates intraoperative fluoroscopy image data, although any suitable imaging technique, such as conventional CT or cone beam CT ("CBCT") techniques, may be used without departing from the examples of the present disclosure. The intraoperative external image data may be displayed in the GUI 500 as an intraoperative external image 530 (e.g., a fluoroscopic image). At a process 220, the medical instrument 512 and the imaging probe 560 may be identified in the intraoperative external image 530. The identification may be made by the control system (e.g., using image processing) and/or by an operator.

As mentioned above, the intraoperative external image data may be received at a control system or other processing platform associated with the medical instrument 512. It is also contemplated that in some examples the shape data associated with the medical instrument 512 may be transferred to the imaging system, or both the shape data and the intraoperative external image data may be transferred to a common platform for processing. In this regard, registration of the shape data of the medical instrument 512 to the intraoperative external image data may be performed by the control system, by the imaging system, or by another platform in operable communication with the intraoperative external imaging system and the control system. In some embodiments, receiving the intraoperative external image data may include receiving one or more timestamps associated with the intraoperative external image data. A first timestamp may indicate the start time of the intraoperative external imaging and a second timestamp may additionally indicate a stop time of the intraoperative external imaging. Alternatively, a timestamp may be associated with each instance of intraoperative external image data. In order to ensure accurate correlation, a clock of the control system of the medical instrument 512 may be synchronized with a clock of the intraoperative external imaging system, and each instance of shape data may also be associated with a timestamp. In this regard, each timestamped instance of intraoperative external image data may be paired with a correspondingly timestamped instance of shape data.

In order to register the fluoroscopic image 530 to the medical instrument 512, while the intraoperative external imaging is performed, at a process 222, shape data from the medical instrument 512 captured during the intraoperative external imaging process 218 may be received. The shape data may be captured for only a brief period of time or may be captured during the whole image capture period of the intraoperative external imaging process.

In some examples, after the intraoperative external imaging data (e.g., fluoroscopy data) is received, a target adjustment procedure may be performed. With reference to FIG. 5C, the target adjustment procedure may be initiated when the control system receives a user input selecting a "Place" icon 580 in the icon menu 570 of the GUI 500. As will be discussed in greater detail below, the target adjustment procedure may use the intraoperative imaging data received from the imaging probe 560 to adjust the position of the target 518 in the virtual navigation view 510.

Figure 6A:
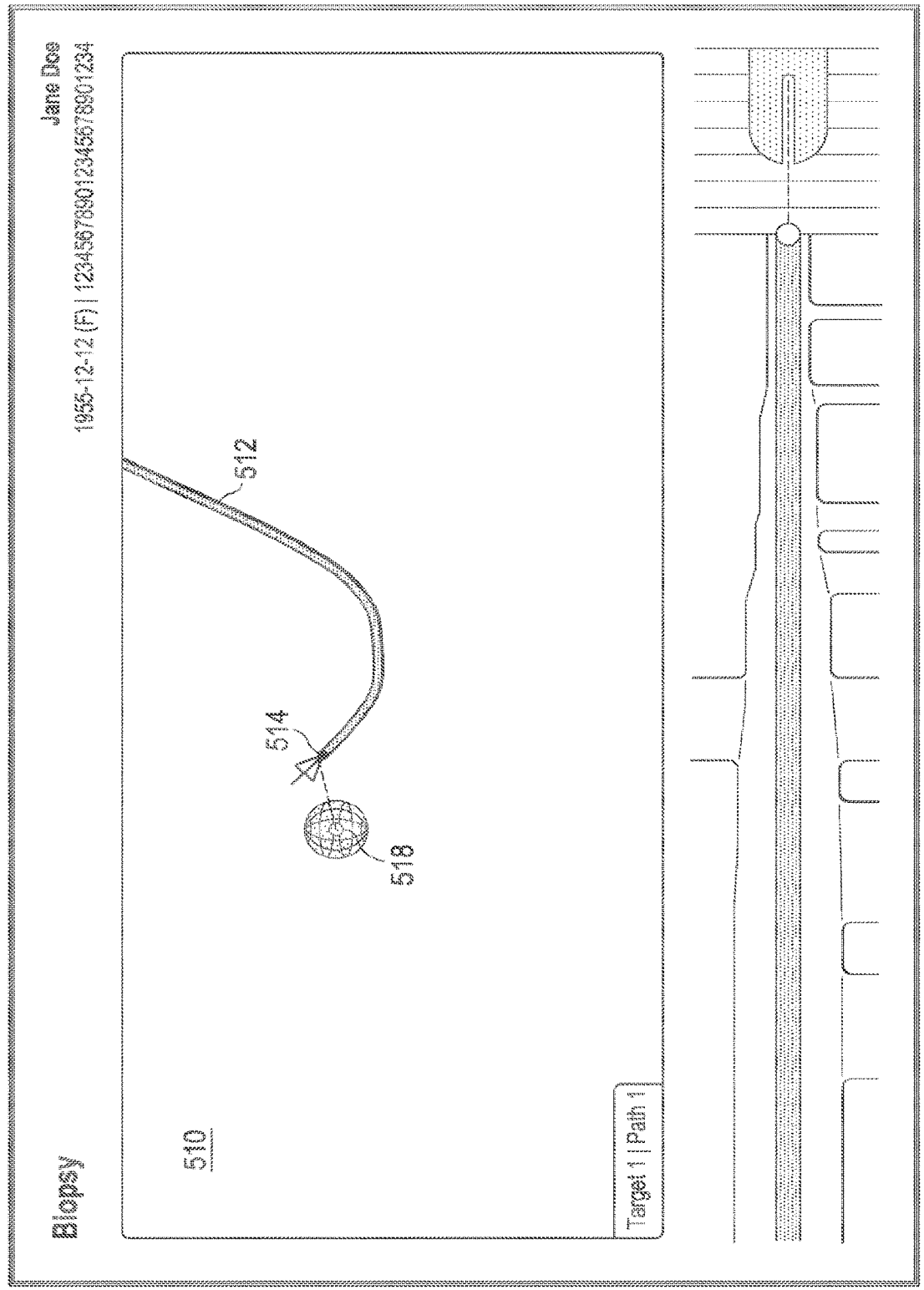
Figure 6C:
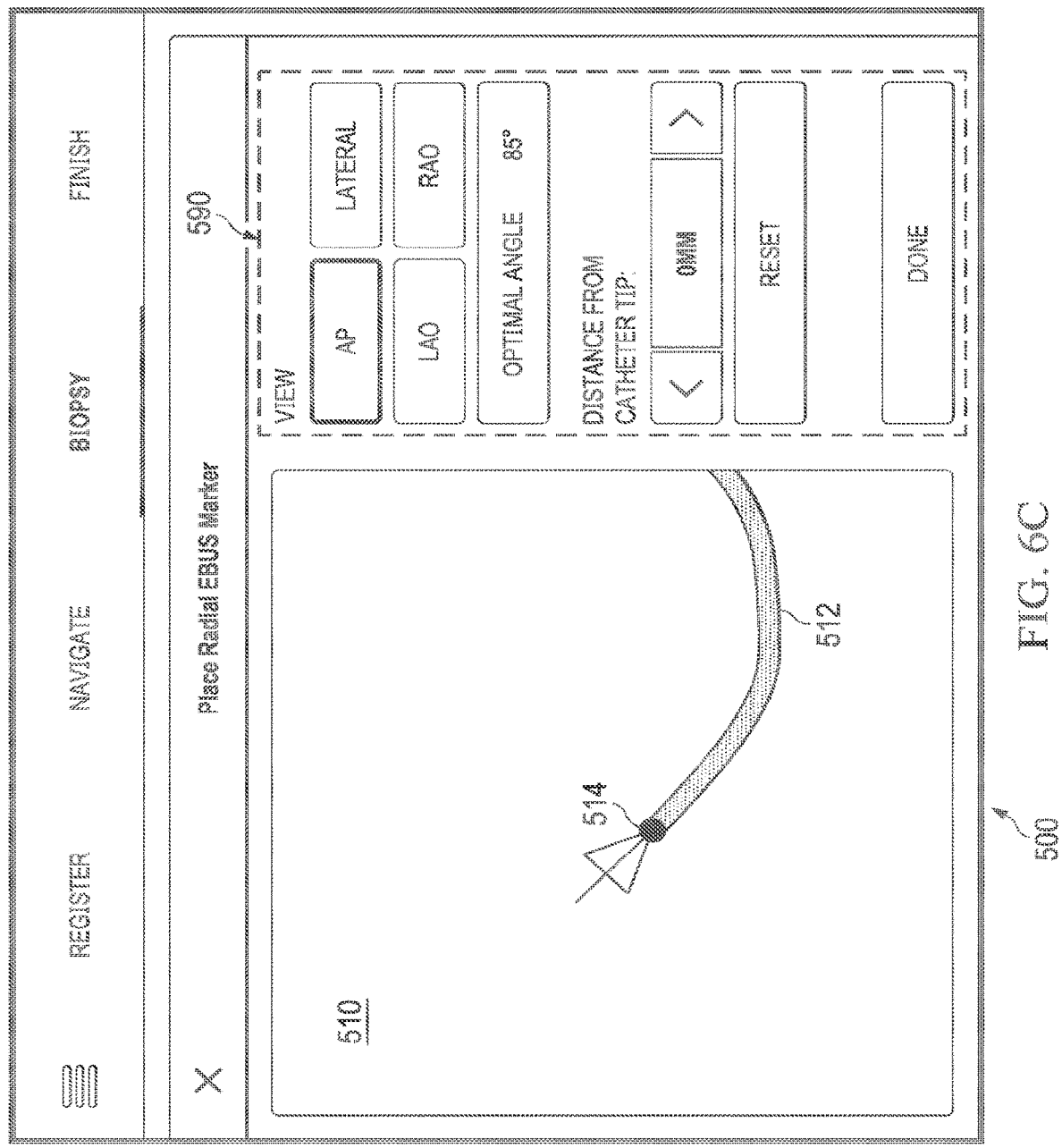

In some examples, the anatomic passageways 516 may be hidden from view and removed from the virtual navigation view 510 displayed in the GUI 500. The control system may receive a user input selecting a "hide airways" icon (not shown) on the GUI 500, or the control system may hide the anatomic passageways in response to other triggers such as selecting the "Place" icon 580. As a result and as seen in FIG. 6A, the anatomic passageways 516 may be hidden from view in the virtual navigation view 510. With the anatomic passageways 516 hidden, the user may more easily see the medical instrument 512 in the virtual navigation view 510. This may allow for the user to more clearly visualize the orientation of the medical instrument 512 in the virtual navigation view 510. This may additionally or alternatively allow for more refined and accurate adjustments to the shape of the medical instrument 512 to be made, which will be discussed in further detail below. Additionally or alternatively, the anatomic passageways 516 may be made transparent with outlines of the anatomic passageways 516 still visible in the virtual navigation view 510. As further shown in FIG. 6A, the target 518 is visible in the virtual navigation view 510 but may similarly be hidden and removed from the virtual navigation view 510, as seen in FIG. 6C.

FIG. 6B illustrates the intraoperative external image 530, the path view 540, and the ultrasound image 550. As further shown in FIG. 6B, the planned traversal path 542 may be removed from the path view 540. In some examples, the planned traversal path 542 may be removed from the path view 540 when the control system receives the user input selecting the "Place" icon 580. In some cases, when the "Place" icon 580 is selected, the icon menu 570 may be replaced by an icon menu 590, as shown in FIG. 6C. A zoomed in view of the virtual navigation view 510 may also be displayed on the GUI 500. In other examples, the icon menus 570 and 590 may be switched at any time according to the user's preference.

Returning to FIG. 2, at a process 224, the medical instrument 512 in the virtual navigation view 510 is matched to the medical instrument 512 in the intraoperative external image 530. The control system may receive one or more user inputs selecting one or more icons (not shown) to adjust a three-dimensional position and/or orientation of the image of the medical instrument 512 in the virtual navigation view 510. For example, the image of the medical instrument 512 may be moved in an X-direction, a Y-direction, and/or a Z-direction in the image reference frame (e.g., the image reference frame 150 of FIG. 1) to match the image of the medical instrument 512 in the intraoperative external image 530. Additionally or alternatively, an orientation or rotation of the image of the medical instrument 512 may be adjusted to match the image of the medical instrument 512 in the intraoperative external image 530.

Figure 7A:
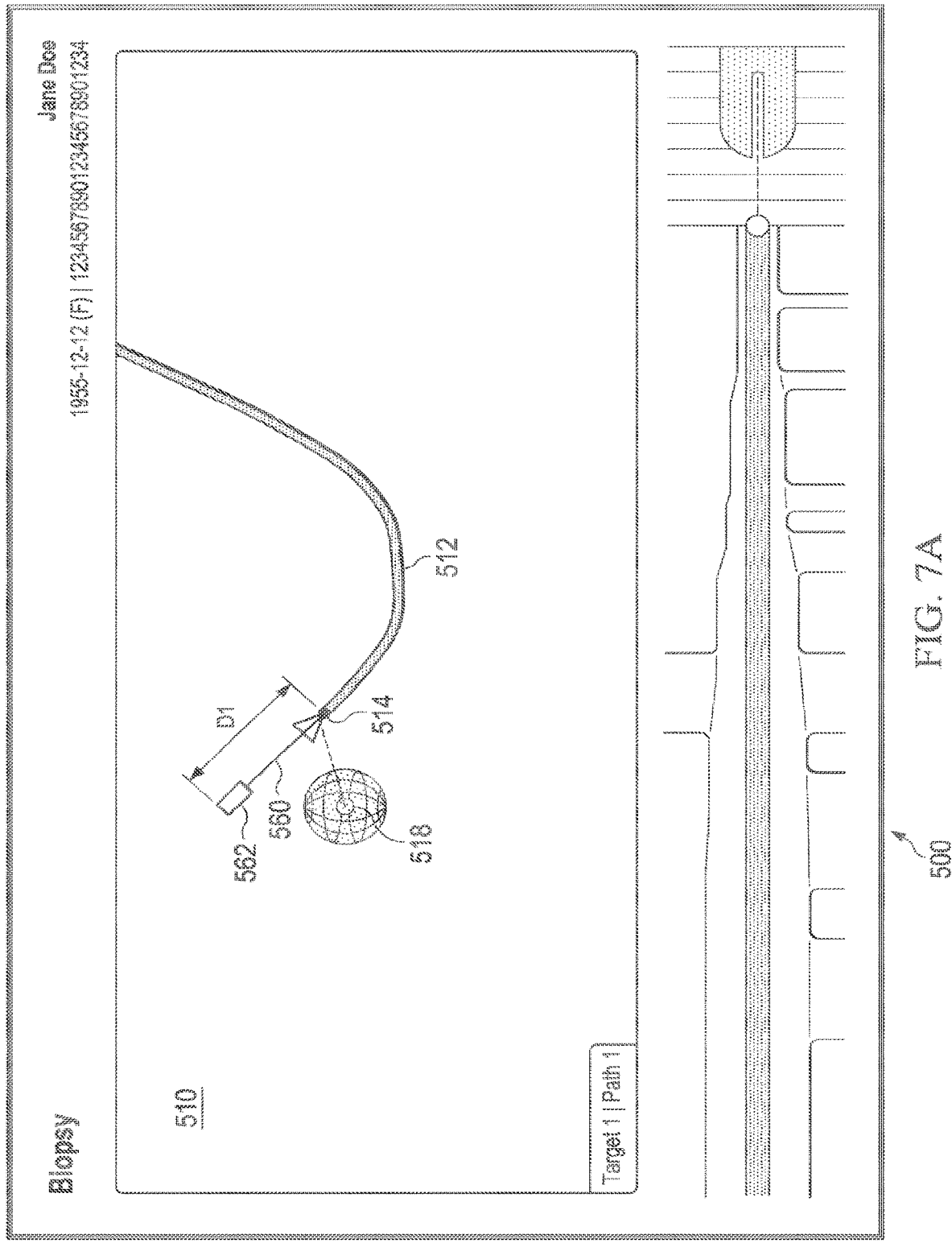
FIGS. 7A-7D illustrate a graphical user interface for placing a virtual imaging probe in a virtual navigation view according to some examples.
Figure 7B:
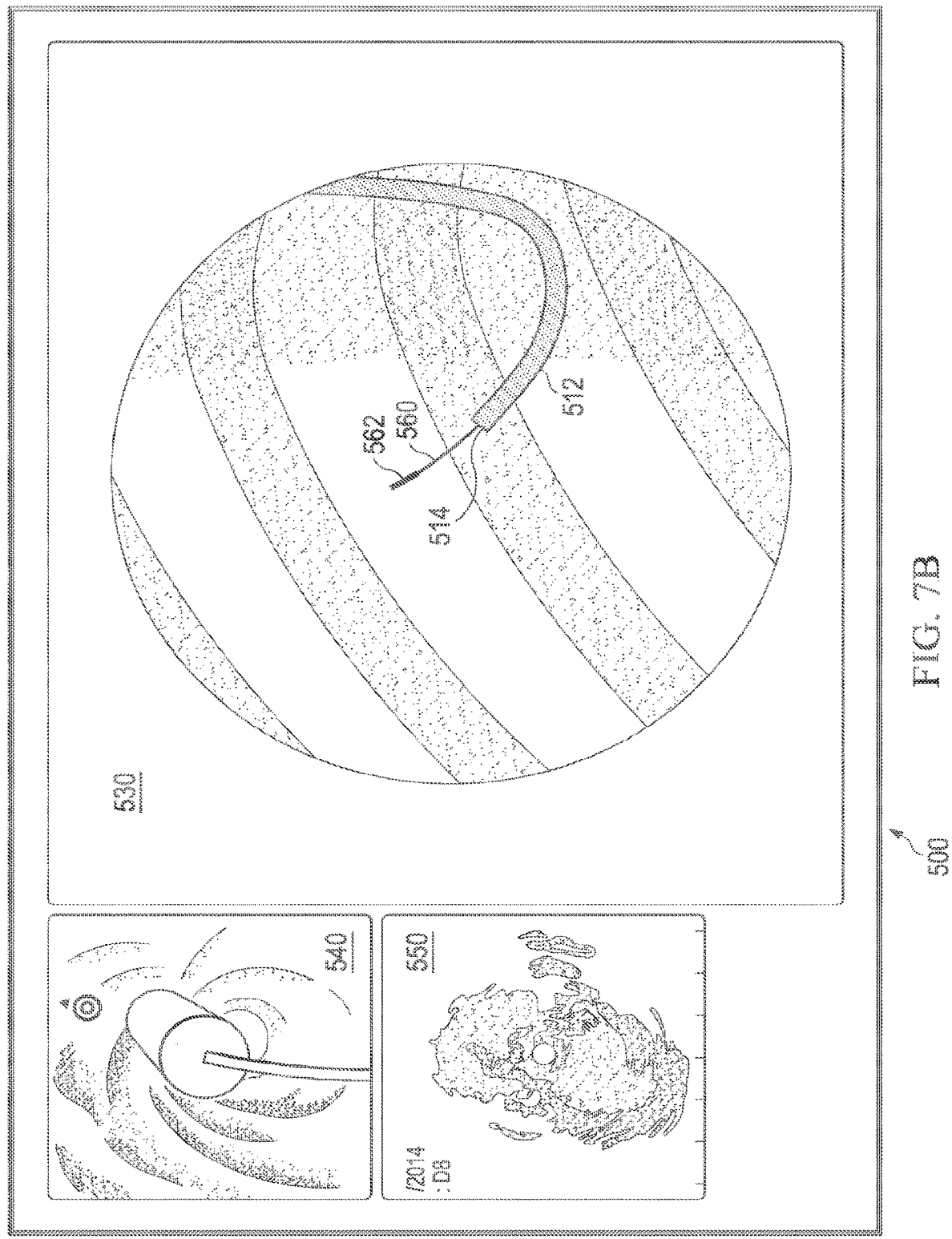
Figure 7C:
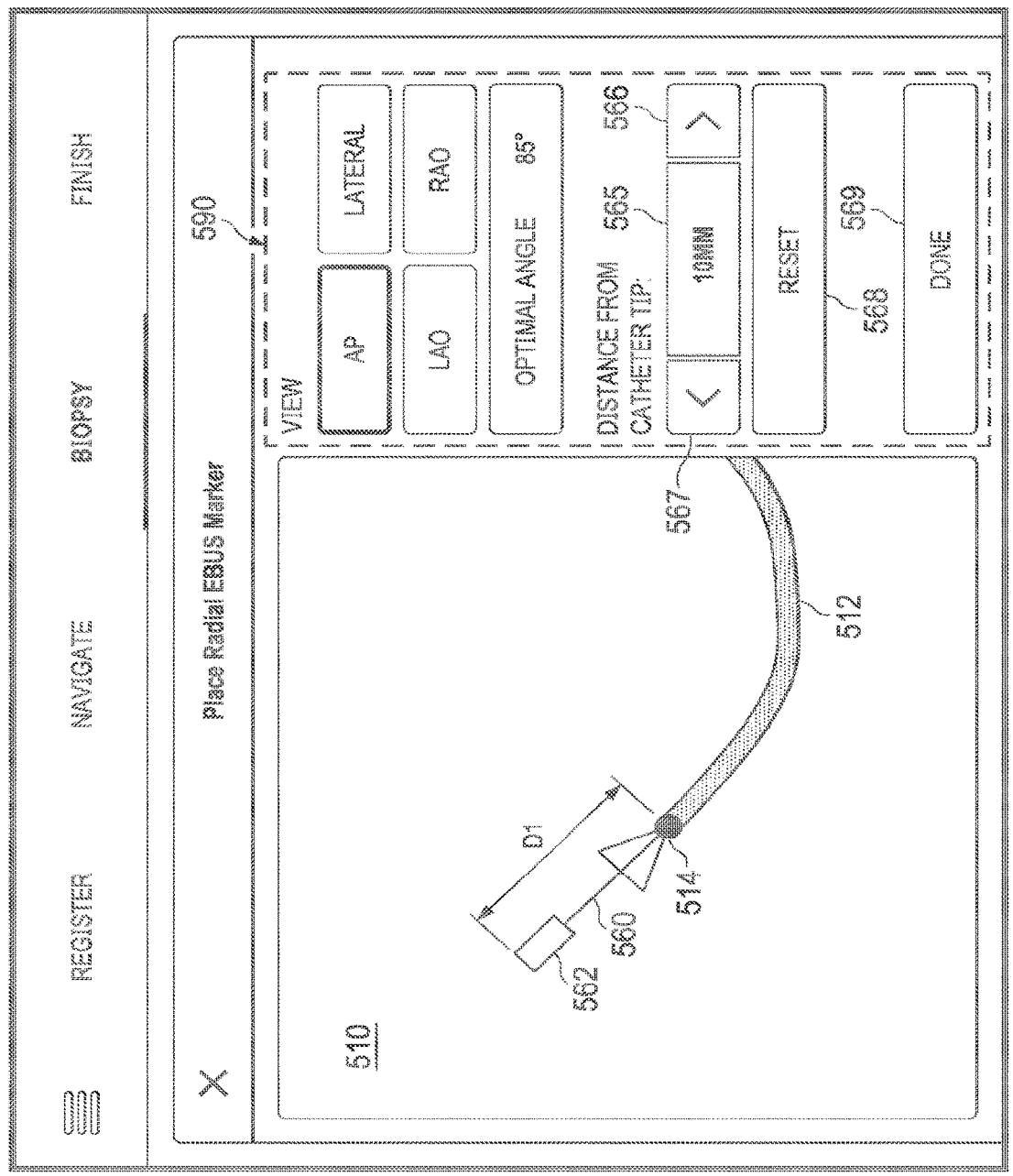

With reference to FIGS. 7A-7C, a synthetic image of the imaging probe 560 may be shown in the virtual navigation view 510 of the GUI 500. In FIG. 7A, the imaging probe 560 is shown as extending from the distal end 514 of the medical instrument 512 by an insertion distance D1, which may be shown in an icon 565 (FIG. 7C). The insertion distance may be measured from the distal end 514 of the medical instrument 512 to a distal end of the imaging device 562. In some examples, when the imaging probe 560 is extended from the medical instrument 512, the imaging probe 560 is extended by a known default insertion distance. The synthetic image of the imaging probe 560 may generate the insertion distance D1 based on the known default insertion distance. The default insertion distance may be 10 mm, as shown in FIG. 7A, but may be 5 mm, 15 mm, or any other desired distance. In some cases, the insertion distance D1 may be adjusted.

As shown in FIG. 7C, the GUI 500 may include an increase icon 566 and a decrease icon 567. The insertion distance D1 may increase when the control system receives a user input selecting the increase icon 566. Similarly, the insertion distance D1 may decrease when the control system receives a user input selecting the decrease icon 567. The insertion distance D1 may be increased or decreased in increments of 1 mm but may be increased or decreased in increments of 2 mm, 3 mm, or any other desired distance. To reset the insertion distance D1 to the default insertion distance, an icon 568 may be selected. In some examples, the imaging probe 560 and/or the imaging device 562 may be hidden and removed from the virtual navigation view 510 as discussed above with respect to FIG. 5C. Any adjustments made to the insertion distance D1 and/or any other adjustments made to the imaging probe 560 may be confirmed when the control system receives a user input selecting a "Done" icon 569. The confirmed adjustments may be revisited and further adjusted at any time.

Figure 7D:
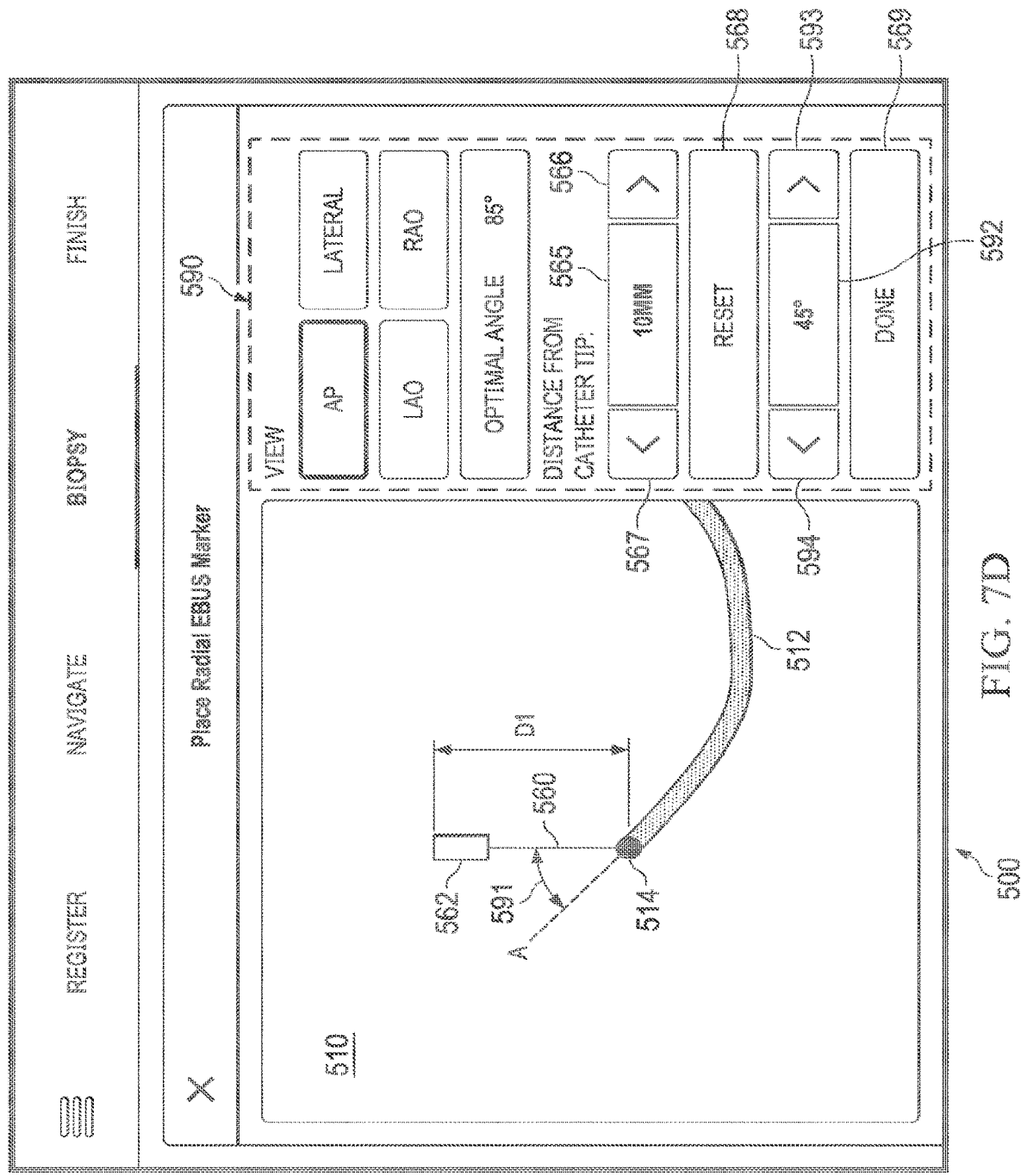

As shown in FIG. 7D, the imaging probe 560 is shown as bending away from a longitudinal axis A of the medical instrument 512 by an angle 591. The angle 591 may be measured from the longitudinal axis A of the medical instrument 512 to the imaging probe 560. The degree of the angle 591 may be shown in an icon 592 of the GUI 500. As shown in FIG. 7D, the GUI 500 may further include an increase icon 593 and a decrease icon 594. The angle 591 may increase when the control system receives a user input selecting the increase icon 593. Similarly, the angle 591 may decrease when the control system receives a user input selecting the decrease icon 594. The angle 591 may be increased or decreased in increments of 1° (i.e., one degree) but may be increased or decreased in increments of 2°, 3°, or any other desired amount of degrees. As shown in FIG. 7D, the angle 591 may be 45°. In some examples, when the imaging probe 560 is bending away from the longitudinal axis A, the imaging probe 560 may be shown within an image of an anatomical passageway, such as one of the anatomical passageways 516. This may help illustrate that the imaging probe 560 may remain within an anatomical passageway even when bent away from the longitudinal axis A. Any adjustments made to the angle 591 and/or any other adjustments made to the imaging probe 560 may be confirmed when the control system receives a user input selecting the "Done" icon 569. The confirmed adjustments may be revisited and further adjusted at any time.

Figure 8A:
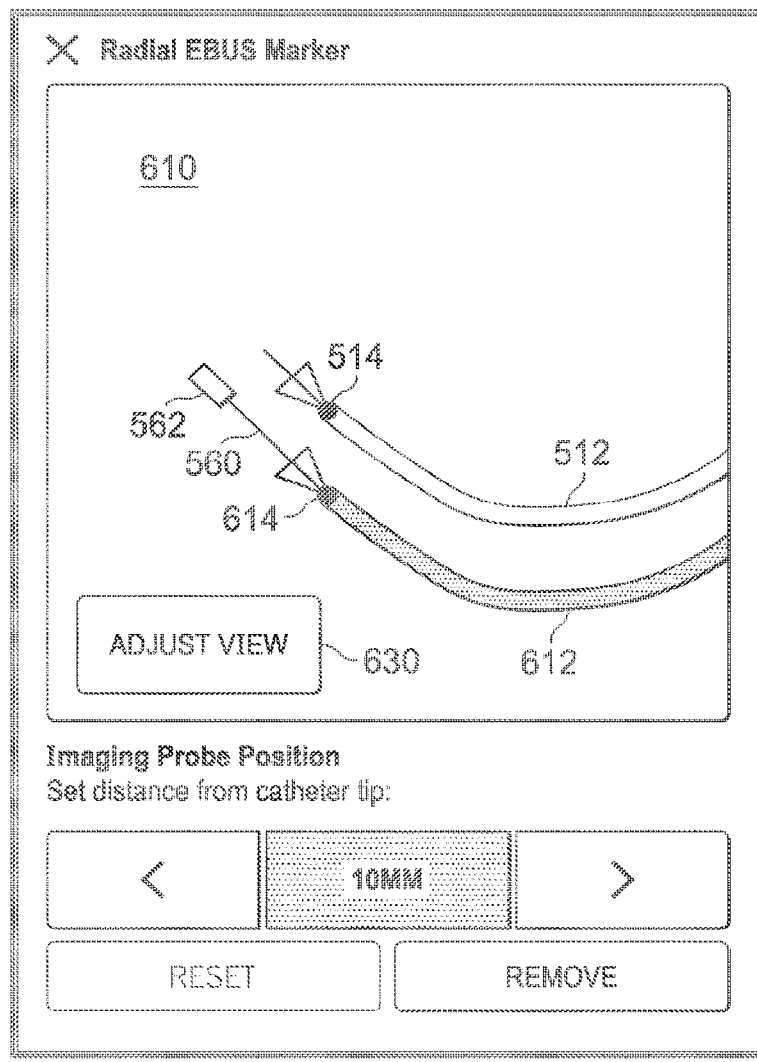
FIGS. 8A and 8B illustrate a graphical user interface for placing a virtual imaging probe in a virtual navigation view according to some examples.
Figure 8B:
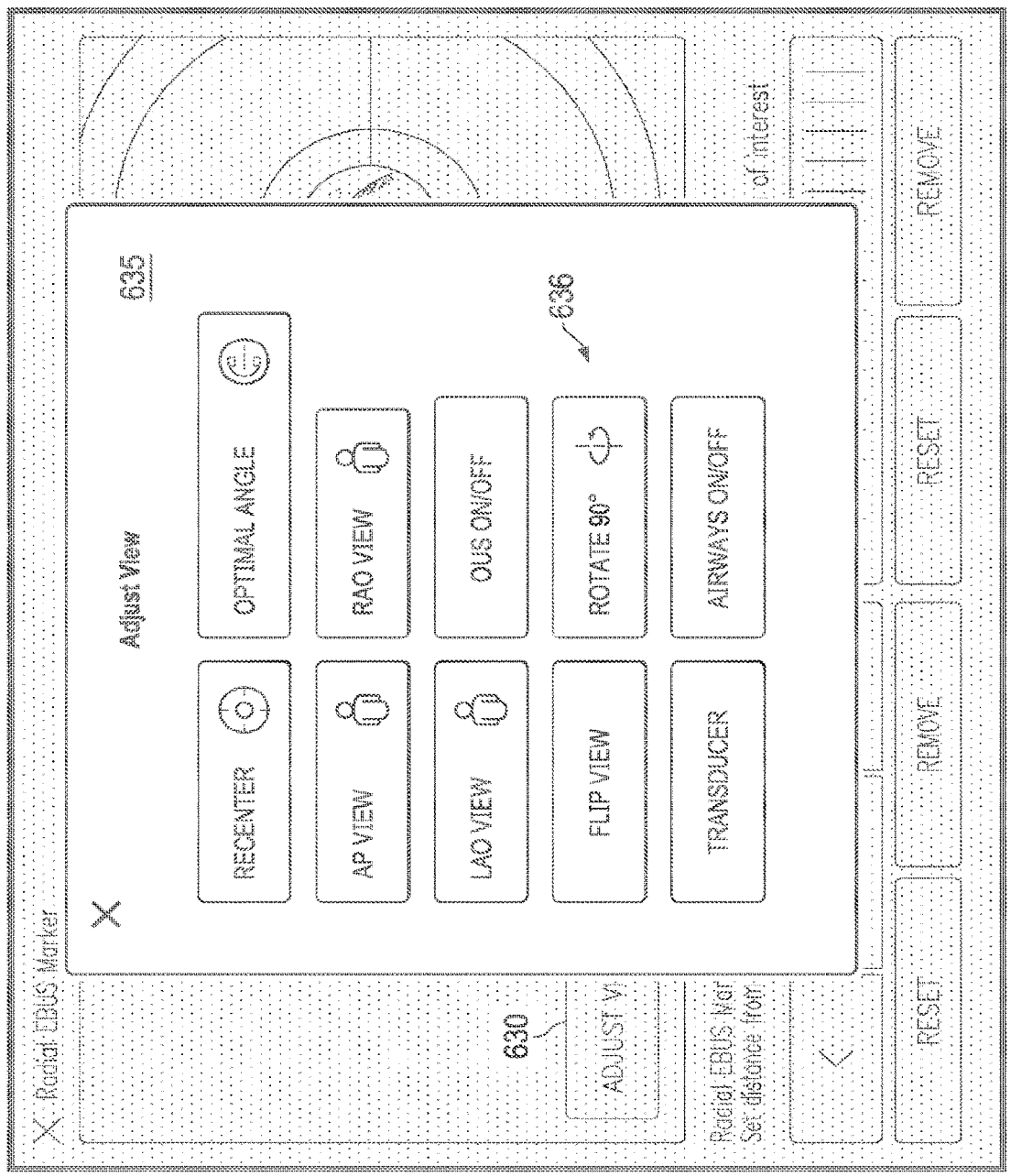

Referring now to FIGS. 8A and 8B, in some examples, a temporary representation 612 of the medical instrument 512 may be displayed in a virtual navigation view 610 of a GUI 600. The GUI 600 may be substantially similar to the GUI 500, and the virtual navigation view 610 may be substantially similar to the virtual navigation view 510. During the medical procedure, the position of the medical instrument 512 may shift as a result of the patient's breathing. In some examples, the temporary representation 612 may illustrate a position of the medical instrument 512 at a particular time in the patient's respiratory cycle, such as a point in time of full expiration, a point in time of full inspiration, or any time in between. In some cases, the intraoperative imaging data received from the imaging probe 560 may provide a clearer picture of the target 518 at different points in time during the patient's respiratory cycle. Additionally or alternatively, the intraoperative imaging data may provide a picture of the target 518 at any point in time during the patient's respiratory cycle. For example, the intraoperative imaging data may be provided in real time at all points during the patient's respiratory cycle. Clear intraoperative imaging data may help increase the accuracy of the determination of the location of the target 518. In some examples, the temporary representation 612 of the medical instrument 512 may illustrate the position of the medical instrument 512 at the point in time during the patient's respiratory cycle when the intraoperative image data is clearest. The imaging probe 560 may be illustrated in the virtual navigation view 610 as extending from a distal end 614 of the temporary representation 612 of the medical instrument 512. In some examples, the shape of the temporary representation 612 of the medical instrument 512 may be adjusted in a similar manner to that discussed above with respect to adjusting the shape of the medical instrument 512. The discussion above similarly applies to any shifting of the position of the medical instrument 512 due to the patient's cardiac cycle.

The control system may receive a user input selecting an "Adjust View" icon 630 of the GUI 600. When the "Adjust View" 630 is selected, an "Adjust View" menu 635 may be shown on the GUI 600. The "Adjust View" menu 635 may include one or more icons 636, which may be selected to adjust how the medical instrument 512 or the temporary representation 612 of the medical instrument 512 are displayed in the virtual navigation view 610. For example, the virtual navigation view 610 may be flipped and/or rotated. Additionally, the perspective of the virtual navigation view 610 may be changed, and/or the anatomic passageways 516 may be removed from the virtual navigation view 610 as discussed above with respect to FIG. 5C.

When the shape of the medical instrument 512 and the view of the virtual navigation view 510 have been finalized, the control system may receive a user input placing an imaging probe marker 700 in the virtual navigation view 510.

Figure 9A:
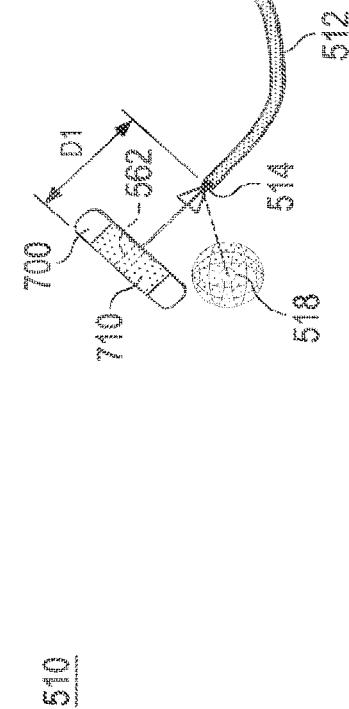
FIGS. 9A-9C illustrate a graphical user interface for placing and adjusting an imaging probe marker in a virtual navigation view according to some examples.
Figure 9A:
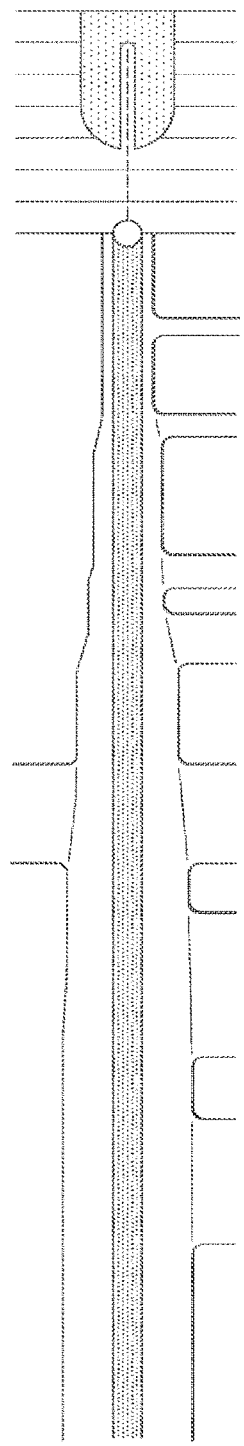
Figure 9B:
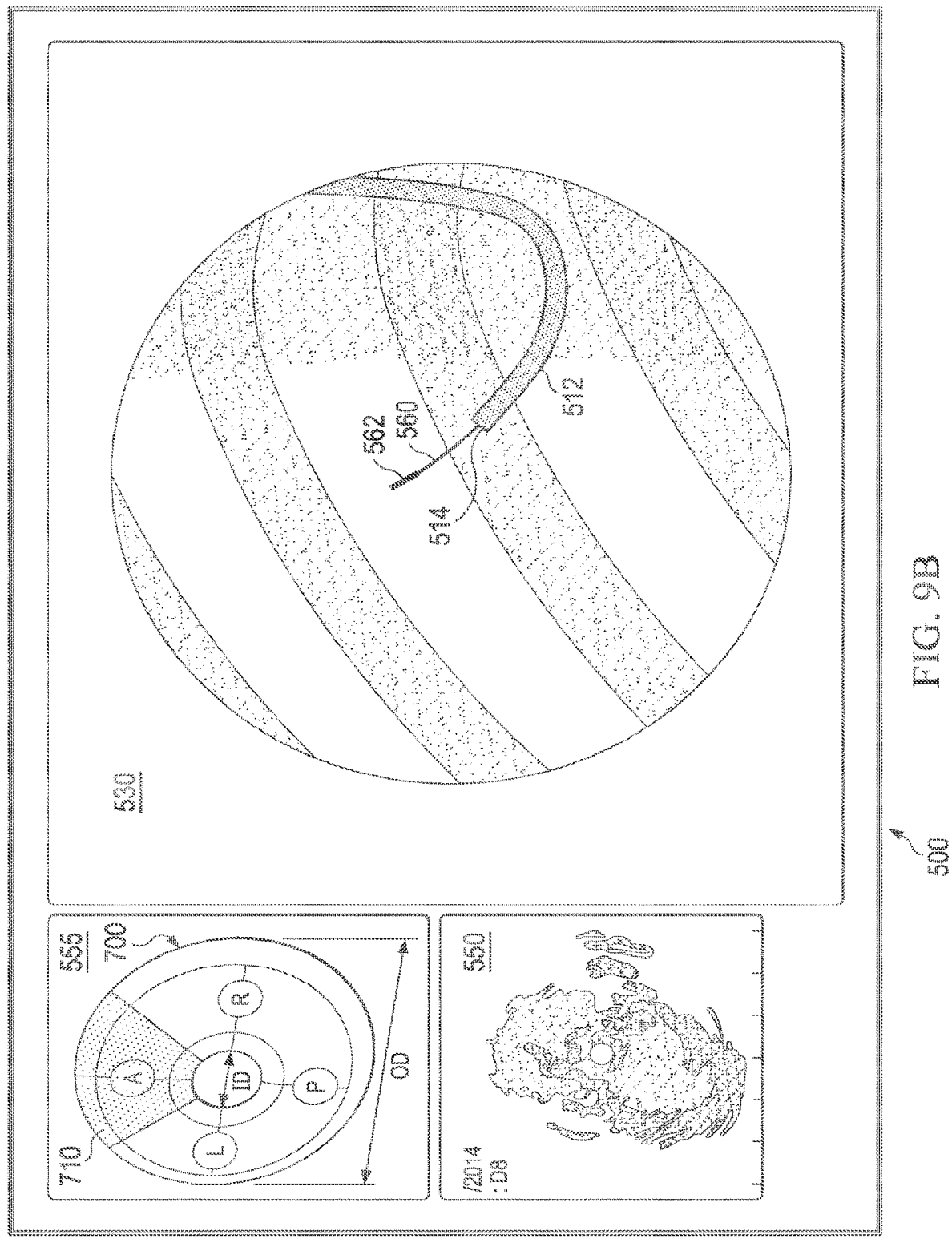

Returning to FIG. 2, at a process 226, the imaging probe 560 in the virtual navigation view 510 is matched to the imaging probe 560 in the intraoperative external image 530. The control system may receive one or more user inputs selecting one or more icons (not shown) to adjust a three-dimensional position and/or orientation of the image of the imaging probe 560 in the virtual navigation view 510. For example, the image of the imaging probe 560 may be moved in an X-direction, a Y-direction, and/or a Z-direction in the image reference frame (e.g., the image reference frame 150 of FIG. 1) to match the image of the imaging probe 560 in the intraoperative external image 530. Additionally or alternatively, an orientation or rotation of the image of the imaging probe 560 may be adjusted to match the image of the imaging probe 560 in the intraoperative external image 530. Additionally or alternatively, the bend angle of the imaging probe 560 shown in the virtual navigation view 510 may be adjusted to match the bend angle of the imaging probe 560 shown in the intraoperative external image 530. In some examples, the imaging probe 560 is flexible and deflects/bends away from a longitudinal axis of the medical instrument 512 when the imaging probe 560 is deployed. For example, FIG. 9B illustrates the imaging probe 560 bending away from the longitudinal axis of the medical instrument 512.

Additionally or alternatively, the insertion distance D1 of the imaging probe 560 may be measured. In some examples, the insertion distance D1 is measured by the control system. For example, the control system and/or an image processing system may analyze the intraoperative external image 530 and measure the insertion distance D1. Additionally or alternatively, the insertion distance D1 may be measured by a user and then input into the control system (e.g., via the GUI 500). For example, a sensor at a proximal end of the imaging probe 560 may measure how far the distal end of the imaging probe 560 is extended from the distal end 514 of the medical instrument 512. Other measurement techniques may be used without departing from the examples discussed herein. The insertion distance D1 in the virtual navigation view 510 may be matched to the measured insertion distance D1.

Returning to FIG. 2, at a process 228, a position and an orientation of an imaging probe marker 700 may be determined in the virtual navigation view 510. In some examples, the imaging probe marker 700 may be shown in the virtual navigation view 510 when the control system receives a user input selecting the "Place" icon 580, which is discussed above with respect to FIG. 5C. In other examples, the imaging probe marker 700 may be shown in the virtual navigation view 510 when the control system receives a user input selecting the "Done" icon 569, which is discussed above with respect to FIG. 7C. FIG. 9A illustrates the imaging probe marker 700 in the virtual navigation view 510. The view shown in FIG. 9A is a side view of the imaging probe marker 700, but any other view, including a 3D perspective view, may be shown in the virtual navigation view 510.

As shown in FIG. 9A, the imaging probe marker 700 may be positioned at the distal end of the imaging probe 560 around the imaging device 562. For example, the imaging probe marker 700 may be concentric with the imaging device 562. The imaging probe marker 700 may represent a field of view of the imaging device 562 (e.g., an imaging plane of the imaging device 562). In some examples, the imaging probe marker 700, and therefore the imaging plane of the imaging device 562, may be perpendicular to a longitudinal axis of the imaging probe 560. As discussed above, the imaging device 562 may be an ultrasound imaging device, such as an ultrasound transducer. The transducer may spin about a longitudinal axis of the imaging probe 560, and the ultrasound image 550 captured by the transducer may include a 360° radial field of view. To illustrate this 360° radial field of view, the imaging probe marker 700 may be donut shaped, as shown in the window 555 of the GUI 500 in FIG. 9B and in the window 720 of the GUI 500 in FIG. 9C. The imaging probe marker 700 may be any other toroidal shape, such as a disk, a ring, or the like. An outer diameter OD of the imaging probe marker 700 corresponds to an outer edge of the field of view of the imaging device 562. An inner diameter ID of the imaging probe marker 700 corresponds to an outer diameter of the imaging device 562. In some alternative examples, the imaging probe marker 700 may be the ultrasound image 550. In such examples, the ultrasound image 550 may be registered to the reference frame of the virtual navigation view 510 (e.g., the image reference frame 150). In some examples, the control system may receive a user input selecting an icon 582 (FIG. 5C), which may hide the imaging probe marker 700 in the virtual navigation view 510.

Figure 3:
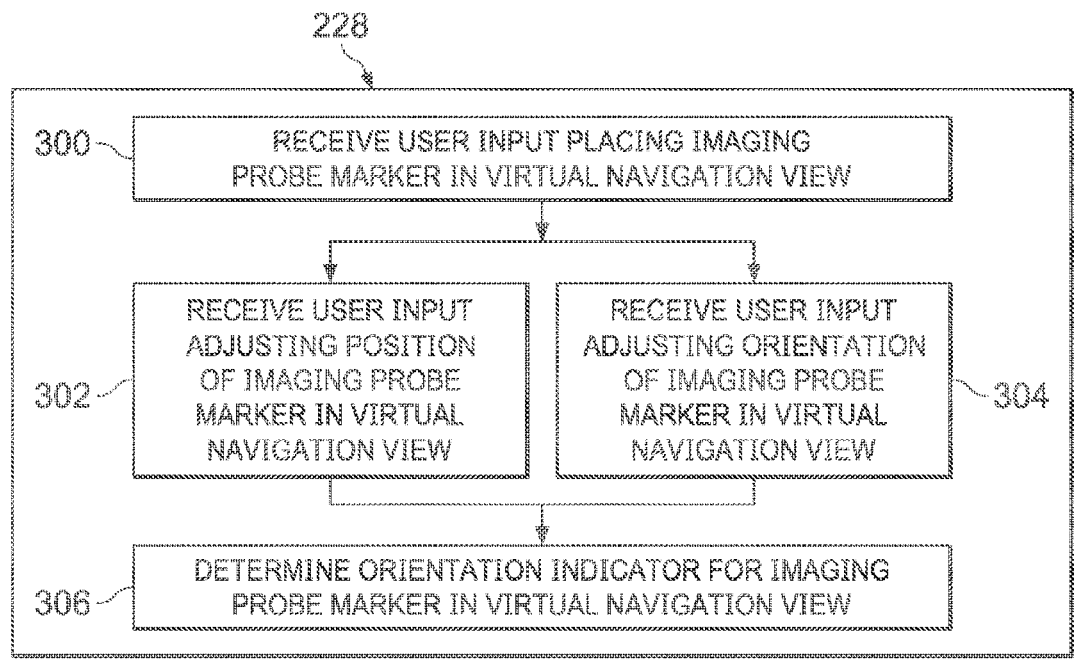
FIG. 3 illustrates a method for placing an imaging probe marker in a virtual navigation view according to some examples.

Referring now to FIG. 3, determining the position and orientation of the imaging probe marker 700 (at process 228 of method 200) may include a control system receiving a user input selecting an icon to place the imaging probe marker 700 in the virtual navigation view 510 at a process 300. As discussed above, the control system may receive this user input when the user selects the "Place" icon 580 in the GUI 500. In other examples, the control system may receive the user input via an audible command, a hand gesture, or the like.

Figure 9C:
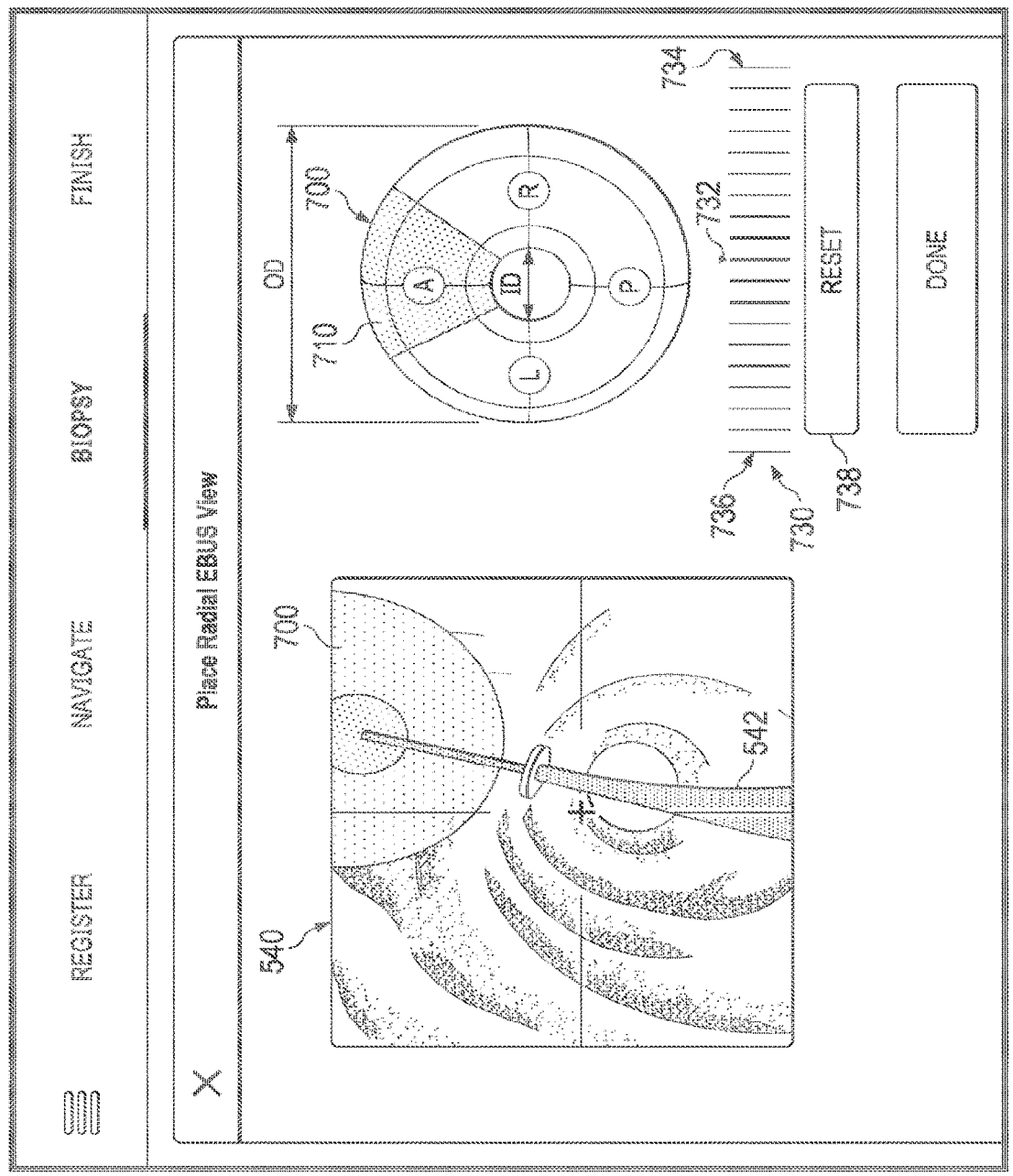

In FIG. 9A, the imaging probe marker 700 is illustrated in a side view. In FIGS. 9B and 9C, a perspective view of the imaging probe marker 700 is displayed in the GUI 500. In some examples, an orientation indicator 710 may be overlaid on the imaging probe marker 700. The orientation indicator 710 may be shown as a wedge but may be any other shape or indicator, such as a ray line, a dotted line, a star, a circle, or the like. In some examples, the orientation indicator 710 may be illustrated as the target 518. The orientation indicator 710 may indicate a suggested radial deployment location for a medical tool, which will be discussed in greater detail below.

In some alternative examples, the suggested orientation of the target 518 may be based on the orientation of the target 518 in the preoperative imaging data. For example, the control system may determine the orientation of the target 518 in the preoperative imaging data based on where the target 518 is positioned relative to one or more of the anatomical passageways 516. Before and/or during the biopsy procedure, the control system may determine the anatomical passageway 516 in which the medical instrument 512 is located. Based on the location of the medical instrument 512, the control system may determine the suggested orientation of the target 518 relative to the anatomical passageway 516 in which the medical instrument 512 is positioned. A medical tool may be deployed toward the suggested orientation of the target 518, which will be discussed in greater detail below.

At a process 302, a position of the imaging probe marker 700 in the virtual navigation view 510 is adjusted based on the adjusted position of the imaging device 562 such that the position of the imaging probe marker 700 is adjusted to match the adjusted position of the imaging device 562. The control system may receive one or more user inputs selecting one or more icons in the GUI 500 (not shown) to adjust the position of the imaging probe marker 700 in the virtual navigation view 510. At a process 304, an orientation of the imaging probe marker 700 in the virtual navigation view 510 is adjusted based on the adjusted orientation of the imaging device 562 such that the orientation of the imaging probe marker 700 is adjusted to match the adjusted orientation of the imaging device 562. The orientation of the imaging probe marker 700 may be a plane of orientation of the imaging probe marker 700. The control system may receive one or more user inputs selecting one or more icons in the GUI 500 to adjust the orientation of the imaging probe marker 700 in the virtual navigation view 510. When the imaging probe marker 700 is in the adjusted position/orientation, the imaging probe marker 700 may represent an imaging plane of the imaging probe 560. As shown in FIG. 9C, the GUI 500 may include the path view 540, and the traversal path 542 may be illustrated as extending to and/or through the imaging probe marker 700.

Figure 4:
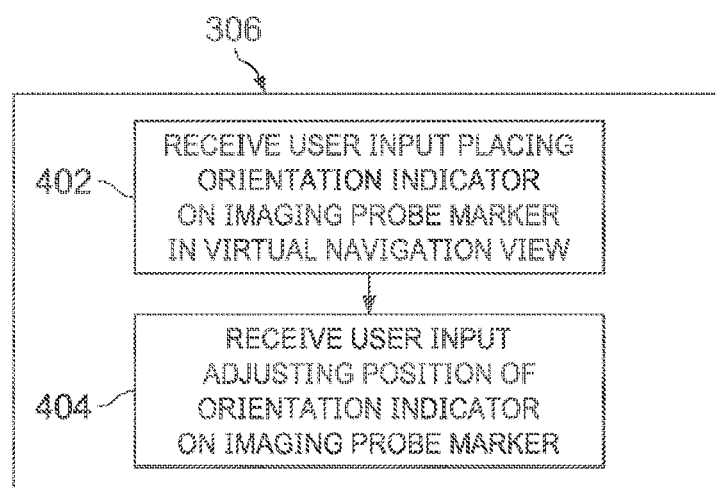
FIG. 4 illustrates a method for determining an orientation indicator for an imaging probe marker according to some examples.

At a process 306, the position and/or orientation of the orientation indicator 710 is determined. With reference to FIG. 4, at a process 402, the control system may receive a user input placing the orientation indicator 710 on the imaging probe marker 700 in the virtual navigation view 510. For example, the control system may receive one or more user inputs selecting one or more icons in the GUI 500, such as the icon 730, to place the orientation indicator 710 on the imaging probe marker 700 in the virtual navigation view 510. In some examples, a default position of the orientation indicator 710 is the "12:00" position of the imaging probe marker 700, as shown in FIGS. 9B and 9C, but may be any other position.

At a process, 404, an orientation of the orientation indicator 710 on the imaging probe marker 700 is adjusted to a suggested orientation, which may match an orientation of a target, such as the target 518, indicated in the preoperative imaging data. For example, if the preoperative imaging data as displayed in the path view 540 indicates that the target 518 is at the "2:00 position" of an anatomic passageway outside of which the target 518 is located, then the orientation indicator 710 may be rotated to be centered on the "2:00 position" on the imaging probe marker 700. In some examples, the rotation of the orientation indicator 710 may be adjusted when the control system receives a user input adjusting an icon 730. For example, the user input may move an indicator 732 of the icon 730 toward a right edge 734 of the icon 730 and/or toward a left edge 736 of the icon 730. When the indicator 732 moves toward to the right edge 734, the orientation indicator 710 may move in a clockwise direction around the imaging probe marker 700. When the indicator 732 moves toward to the left edge 736, the orientation indicator 710 may move in a counterclockwise direction around the imaging probe marker 700. The orientation indicator 710 may return to the default location when the control system receives a user input selecting a "Reset" icon 738.

In some alternative examples, the control system may automatically place the orientation indicator 710 in a position to match the position of the target 518 in the preoperative imaging data. For example, if the preoperative imaging data indicates that the target 518 is at the "2:00 position" of an anatomic passageway outside of which the target 518 is located, then the orientation indicator 710 may be automatically centered on the "2:00 position" on the imaging probe marker 700.

Returning to FIG. 2, at a process 230, the location of the anatomic target 518 may be adjusted in the virtual navigation view 510 to be positioned within an area inside and/or behind the orientation indicator 710. In some examples, the control system may receive a user input selecting an "Update Target to Region" icon 584 (see FIG. 5C). After receiving this user input, the position of the target 518 may be moved in the virtual navigation view 510 to be positioned within the orientation indicator 710. In some examples, the target 518 may be represented as a region of interest with bounds that may accommodate for any errors, kinematic or otherwise, that may be present within the system.

After the location of the target 518 is updated to be positioned within the orientation indicator 710, the control system may re-register the anatomic model 106 to the surgical reference frame $(X_S, Y_S, Z_S)$ of the patient anatomy based on the updated location of the target 518. In some examples, the control system may automatically perform the re-registration after the location of the target 518 is updated. In other examples, the control system may perform the re-registration after receiving a user input instructing the control system to perform the re-registration.

The re-registration may be performed to ensure that the location of the target 518 is accurately displayed in the virtual navigation view 510. For example, prior to determining the updated location of the target 518, the target 518 may be displayed in the virtual navigation view 510 near a first anatomic passageway of the anatomic passageways 516. In some examples, the updated location of the target 518 may be near the first anatomic passageway. After determining the updated location of the target 518 and prior to the re-registration, the medical instrument 512 may be shown in the virtual navigation view 510 as positioned in a second anatomic passageway of the anatomic passageways 516. After the re-registration, the medical instrument 512 may be displayed in the first anatomic passageway so that the medical instrument 512 is displayed as being positioned in the same anatomic passageway near which the target 518 is displayed.

In some examples, the patient anatomy may only include one anatomical target. In such examples, the re-registration between the anatomic model 106 and the surgical reference frame ($X_S$, $Y_S$, $Z_S$) of the patient anatomy may occur based on the updated location of the anatomical target 518. In other examples, the patient anatomy may include more than one anatomical target. In such examples, when an anatomical target is detected by the imaging probe 560, the control system may determine which anatomical target has been detected. Image processing software may be used to determine which target has been detected. For example, the image processing software may analyze the shape of the detected target, the density of the detected target, what structures are near the detected target, and/or any other like factors. Additionally or alternatively, in examples when one target is positioned in one lobe of the patient anatomy and another target is positioned in another lobe of the patient anatomy, the control system may determine which target has been detected by determining in which lobe the imaging probe 560 was positioned when the imaging probe detected the target. The re-registration between the anatomic model 106 and the surgical reference frame ($X_S$, $Y_S$, $Z_S$) of the patient anatomy may occur based on the location of the detected anatomical target.

The control system may determine an accuracy of the initial registration between the anatomic model 106 and the surgical reference frame ($X_S$, $Y_S$, $Z_S$) of the patient anatomy and may provide a "score" illustrating the accuracy. The score may be provided, for example, on a scale of 0-10, a percentage from 0%-100%, and/or any other scoring method. The accuracy of the registration may be based, for example, on how well the location of the anatomical target 518 in the anatomic model 106 matched the detected location of the anatomical target 518 in the patient anatomy. The accuracy of the registration may be based on any other factor, such as whether the location of the anatomical target 518 in the anatomic model 106 and the detected location of the anatomical target 518 in the patient anatomy are near the same anatomical passageway.

After the location of the target 518 is updated to be positioned within the orientation indicator 710, the control system may receive instructions to navigate the medical instrument 512 to the updated location of the target 518. In some examples, the control system may provide feedback to the user (e.g., visual feedback, haptic feedback, audible feedback, and/or the like) indicating how close the distal end 514 of the medical instrument 512 is to the imaging probe marker 700 and/or the orientation indicator 710. Similarly, the control system may provide feedback to the user indicating how far the distal end 514 of the medical instrument 512 is from the preoperative location of the target 518. A tool of the medical instrument 512 may then be used to treat, observe, biopsy, and/or perform any other desired action to the target 518. An image of the tool may be displayed in the virtual navigation view 510 and/or in any other portion of the GUI 500 discussed above.

Figure 10A:
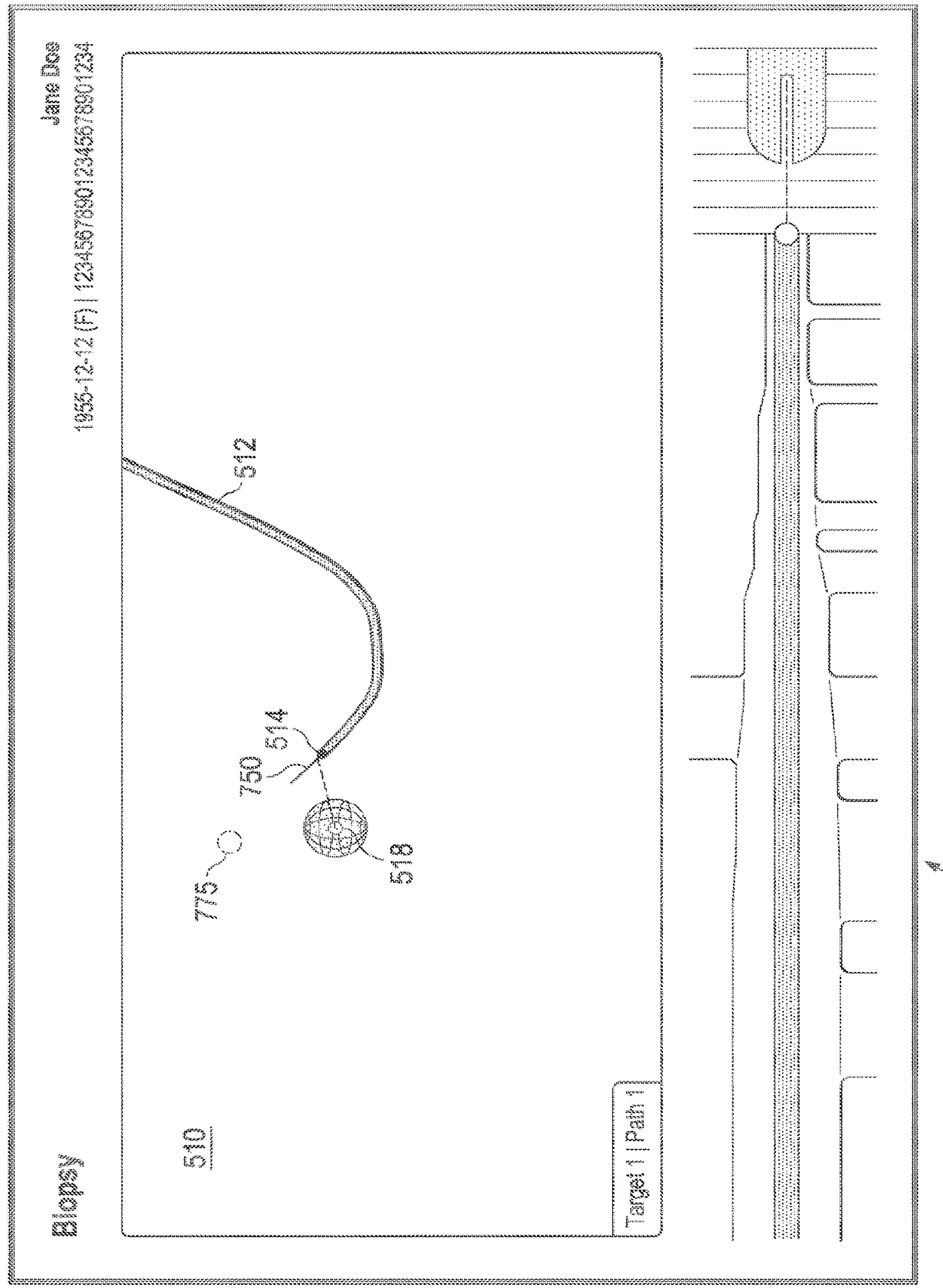
FIG. 10A illustrates a graphical user interface for navigating a tool to an updated location of an anatomical target according to some examples.
Figure 10B:
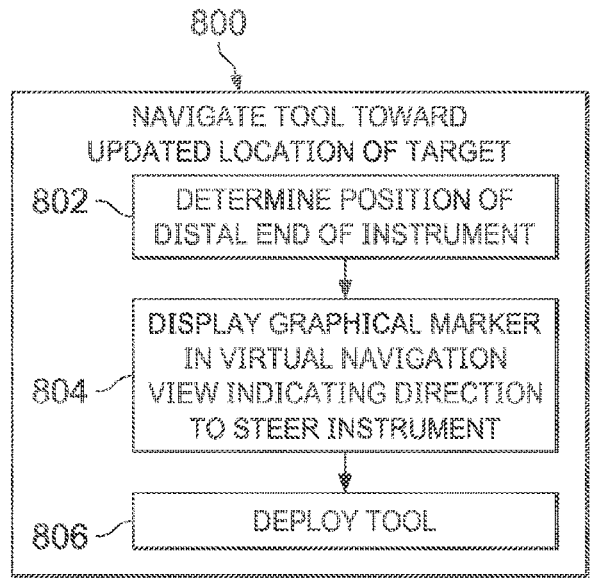
FIG. 10B illustrates a method for navigating a tool to an updated location of an anatomical target according to some examples.

For example, with reference to FIGS. 10A and 10B, a biopsy tool 750 or any other tool may be navigated (e.g., through a lumen of the medical instrument 512 or separately from the medical instrument 512) toward the updated location 775 of the target 518 at a process 800. In some examples, the process 800 may occur after or concurrently with the process 230 of FIG. 2. The navigation of the tool 750 may include determining a position of the distal end 514 of the medical instrument 512 at a process 802. As discussed above, a shape sensor (e.g., a fiber optic shape sensor and/or one or more position sensors) disposed along a length of the medical instrument 512 may be used to provide a position of one or more points along the length of the medical instrument 512, such as the distal end 514. Additionally or alternatively, the position of the distal end 514 may be determined by a user/operator. In some examples, the control system may receive one or more inputs from the user (e.g., via the GUI 500) indicating the position of the distal end 514.

At a process 804, one or more graphical markers may be displayed in the virtual navigation view 510. In some examples, the graphical marker(s) may indicate a direction to steer the distal end 514 of the medical instrument 512 to the updated location 775 of the target 518. The graphical marker(s) may be updated in real time as the distal end 514 is navigated through the anatomic passageways 516. The target 518 may be illustrated as an "X," and "O," or any other visual marker. In some examples, the graphical marker may be an arrow that points toward the updated location 775 of the target 518. The graphical marker may be any other indicator, such as a ray line, a dotted line, a plurality of targets (e.g., spheres, "X's." "O's"), and/or the like that indicates position and/or direction.

The graphical marker may designate an optimal path the medical instrument 512 should traverse to reach the updated location 775 of the target 518. In some examples, by traversing the optimal path, the medical instrument 512 may be placed in an optimal pose to allow the tool 750 to be more easily inserted through the medical instrument 512 (e.g., with minimal friction, with minimized risk of buckling, and/or with minimized risk of damage to the tool 750 or the medical instrument 512). The optimal pose may also position the medical instrument 512 such that when the tool 750 is deployed from the medical instrument 512, the tool 750 is optimally aligned with the target 518 to increase the effectiveness of a biopsy of the target 518, for example. In examples when the graphical marker corresponds to a plurality of targets, the targets may be positioned along the optimal path.

Additionally or alternatively, the control system may provide verbal/auditory instructions, written instructions, and/or haptic feedback to instruct the user how to navigate the medical instrument 512 to the updated location 775 of the target 518.

Figure 11C:
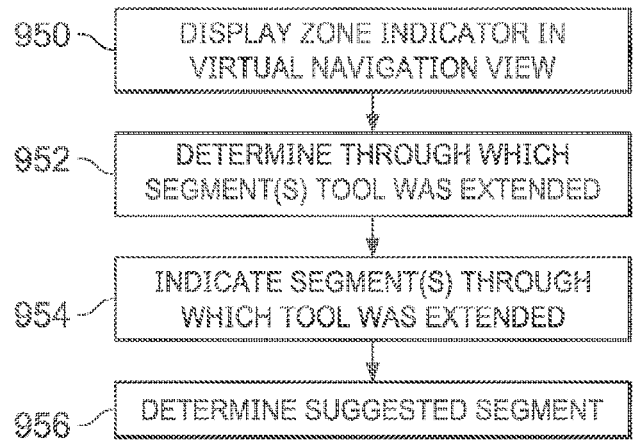
FIG. 11C illustrates a method for using an imaging probe marker to assist with a biopsy procedure according to some examples.
Figure 11A:
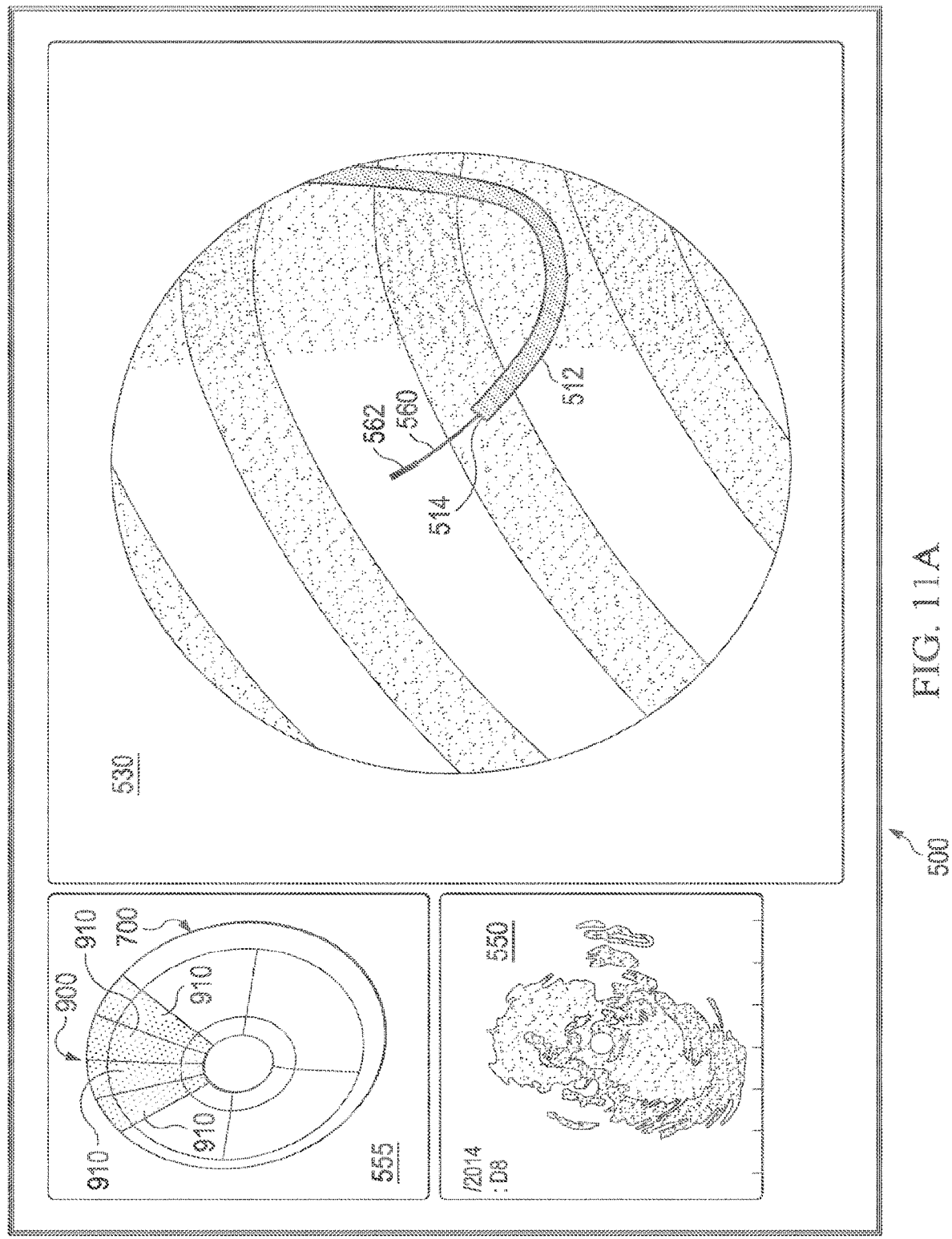
FIGS. 11A and 11B illustrate a graphical user interface for using an imaging probe marker to assist with a biopsy procedure according to some examples.
Figure 11B:
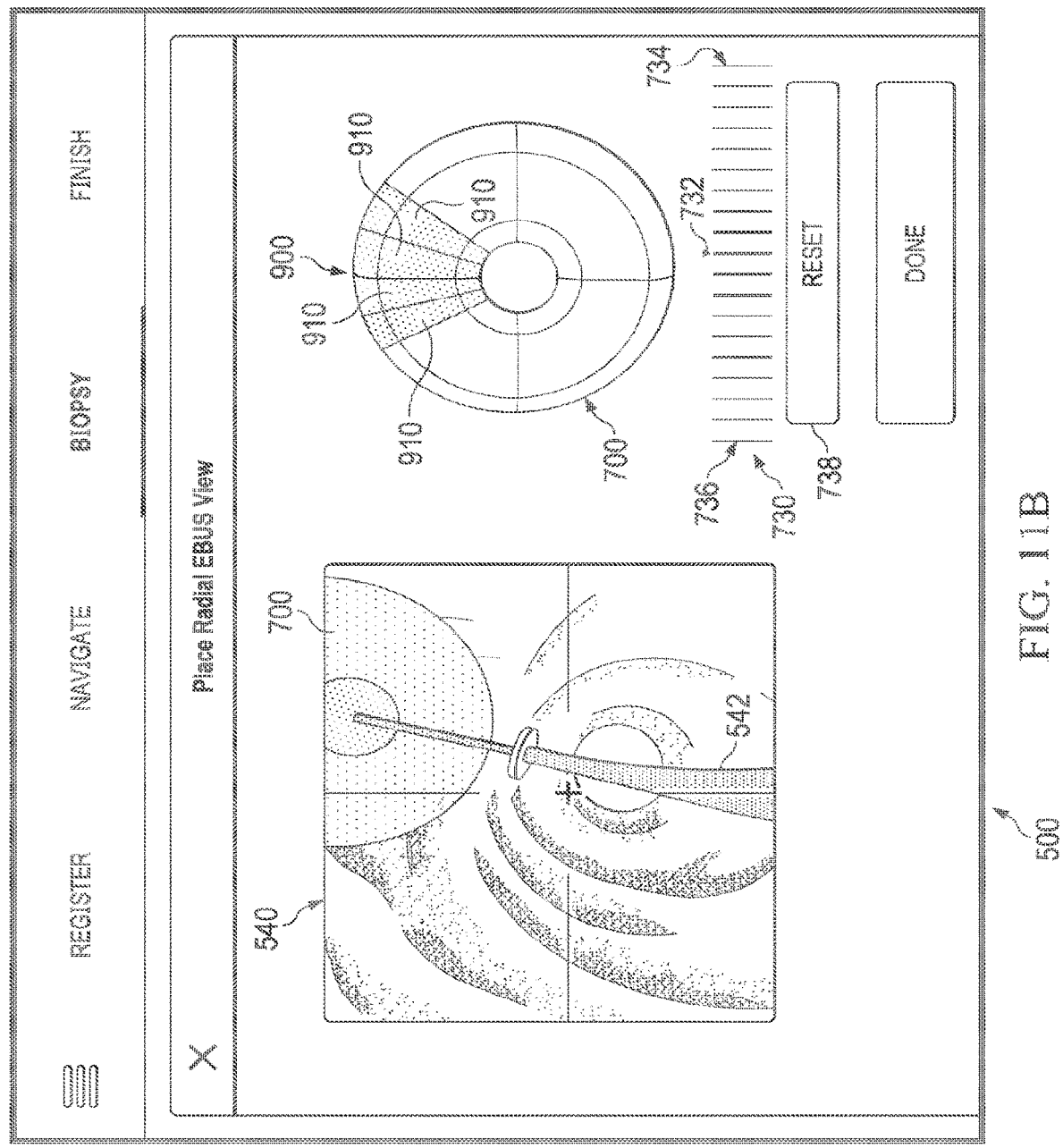

In some examples, when the tool 750 is used to perform the biopsy (or other procedure), the imaging probe marker 700 may remain visible in the virtual navigation view 510, in the path view 540, in the window 555 (FIG. 9B), and/or in any other portion of the GUI 500. With reference to FIGS. 11A-11C, to assist with a biopsy procedure, for example, a zone indicator 900 may be overlaid on the imaging probe marker 700 in the virtual navigation view 510 at a process 950. In some examples, the process 950 may occur after or concurrently with the process 230 of FIG. 2. The zone indicator 900 may be shown as a wedge but may be any other shape or indicator, such as a grid, a target, a checkerboard, a circle, or the like. In some examples, the zone indicator 900 may be the orientation indicator 710.

The zone indicator 900 may divide the imaging probe marker 700 into segments 910 (e.g., 4 segments, 6 segments, 8 segments, or any other number of segments). During the biopsy procedure, the image of the tool 750 in the virtual navigation view 510 may extend through one or more of the segments 910. At a process 952, the control system may determine through which segment(s) 910 the image of the tool 750 was extended. The control system may also indicate the segment(s) 910 through which the tool 750 was extended at a process 954. For example, when the tool 750 is extended through a segment 910, a graphical marker may be displayed over the segment 910. The marker may be an "X," a check mark, a textual message, and/or the like. Additionally or alternatively, when the tool 750 is extended through a segment 910, the segment 910 may be highlighted, change color, fade in color, display a pattern (e.g., dots, stripes, or the like), and/or be visually altered in any other manner. In some examples, the control system may receive a user input identifying a segment 910 through which the tool 750 was extended. The control system may then display a marker and/or alter the segment 910 in any one or more of the manners discussed above.

In some examples, at an optional process 956, the control system determines a suggested segment of the segments 910 within which the tool 750 should first be extended. Before the tool 750 is extended from the medical instrument 512, a target marker may be displayed on the suggested segment. The target marker may be any one or more of the markers discussed above. In some examples, the control system may determine which segment is the suggested segment by analyzing imaging data (e.g., preoperative imaging data, intraoperative imaging data, and/or intraoperative external imaging data) to determine which segment most overlaps the target 518. The segment that most overlaps the target 518 may be the suggested segment. Additionally or alternatively, the control system may receive a user input identifying the suggested segment.

Before or after the tool 750 is inserted through the suggested segment, the tool 750 may be inserted through one or more additional segments. The additional segments may be adjacent to the suggested segment, 180° from the suggested segment, or any other segment of the segments 910. Inserting the tool 750 through additional segments may assist with confirming the location of the target 518. For example, if a biopsy is obtained when the tool 750 is inserted through an additional segment, the control system may determine that at least a portion of the target 518 is located behind that segment. However, if a biopsy is not obtained when the tool 750 is inserted through an additional segment, the control system may determine that at least a portion of the target 518 is not located behind that segment. Inserting the tool 750 through additional segments may also result in the acquisition of multiple biopsies of the target 518. For example, if the target 518 overlaps with more than one segment 910, a biopsy may be taken of the target 518 when the tool 750 is inserted through each segment that the target 518 overlaps. This may help ensure that a biopsy is obtained for the target 518.

Figure 12A:
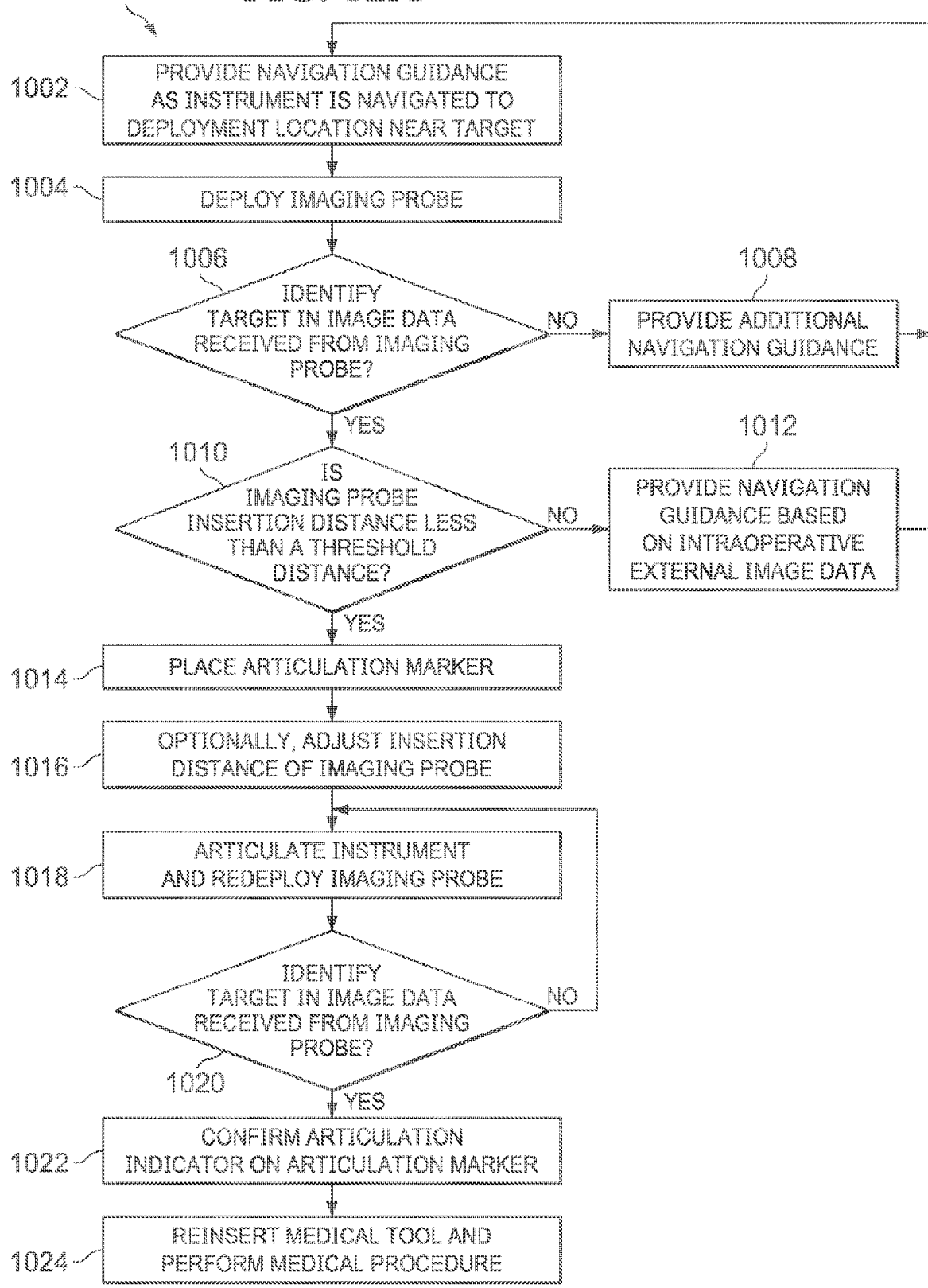
FIG. 12A illustrates a method for placing an articulation marker and confirming an articulation indicator according to some examples.

In some alternative examples, the control system may determine the suggested radial deployment location for the medical tool based on articulation of the medical instrument 104. FIG. 12A illustrates a method 1000 for placing an articulation marker and confirming an articulation indicator according to some examples. The method 1000 is illustrated as a set of operations or processes 1002 through 1024 and is described with continuing reference to FIGS. 13A-13D, which illustrate the GUI 500 in a navigation mode during the performance of the method 1000 according to some examples. While the method 1000 is illustrated as a set of operations or processes 1002 through 1024, in some examples, the method 1000 may include the processes 1002-1012 and may be a method for detecting intraoperative image data. In such examples, a separate method may include the processes 1014-1024 and may be a method for confirming a position and/or orientation of a target around an anatomical passageway. Any other configuration of the method 1000 may be performed.

Figure 13A:
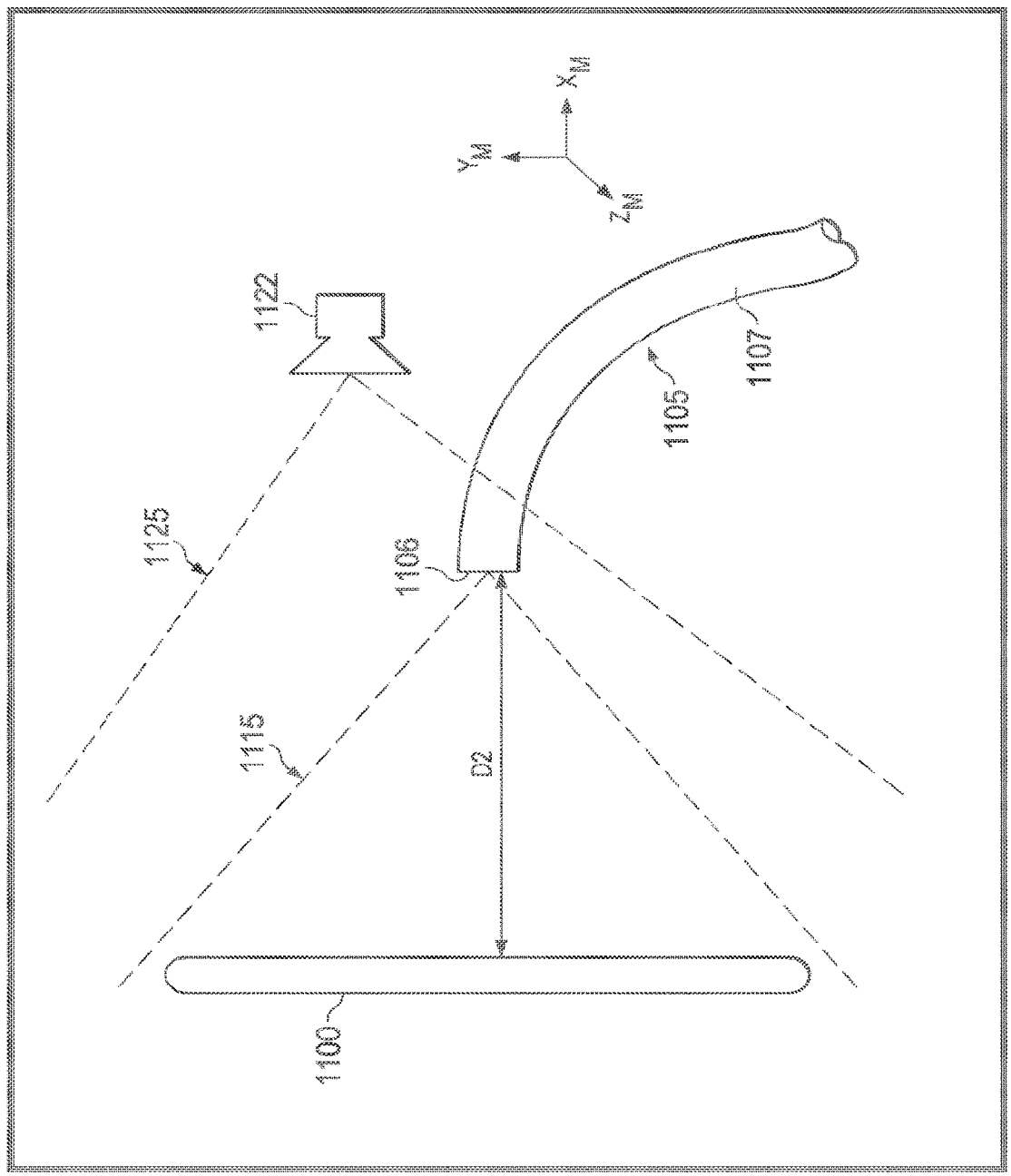
FIG. 13A illustrates a virtual medical instrument and an articulation marker according to some examples.
Figure 13B:
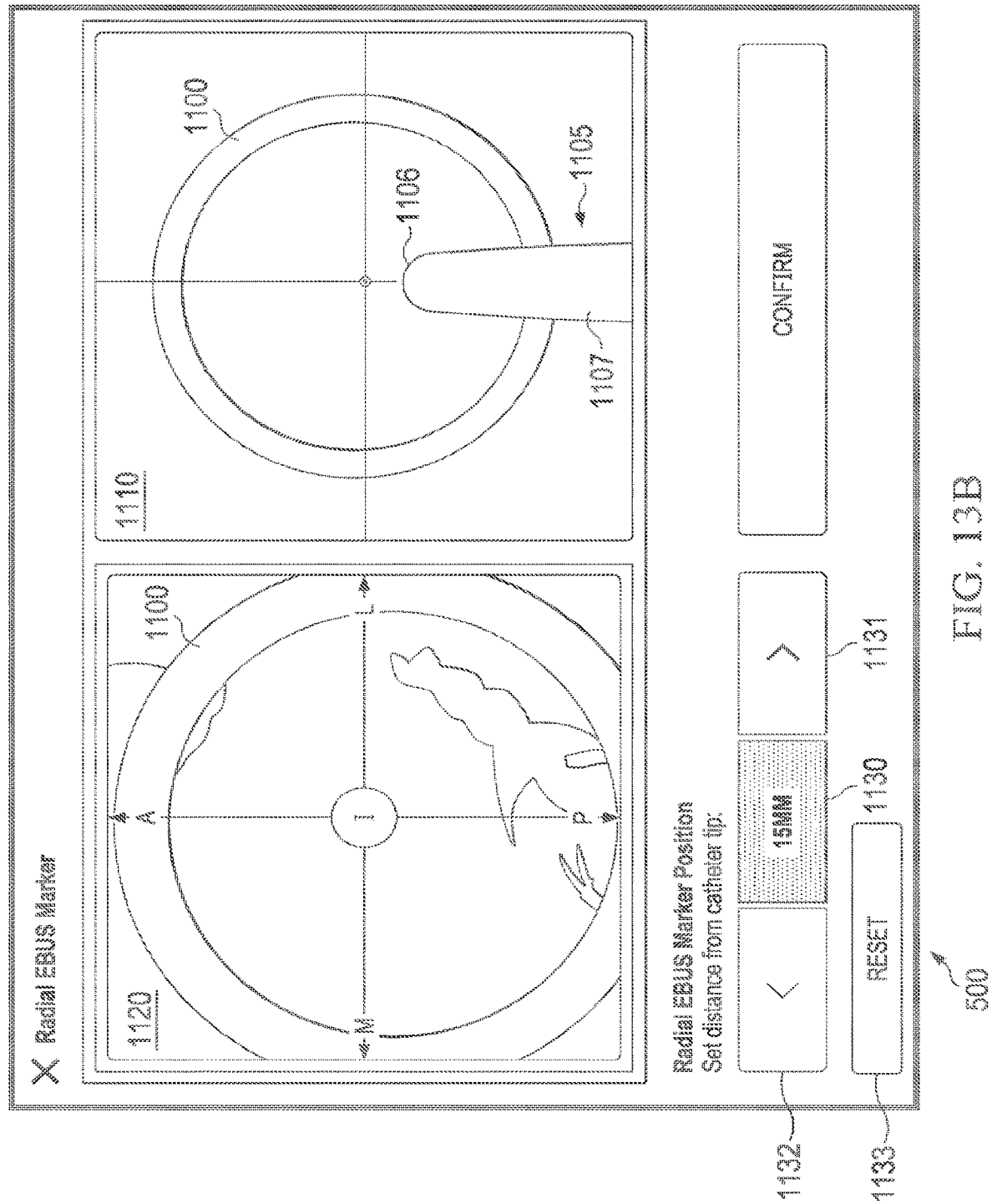
FIGS. 13B-13D illustrate a graphical user interface for placing an articulation marker and viewing articulation of a virtual medical instrument according to some examples.

As shown in FIG. 13B, the GUI 500 may include a medical instrument view 1110 and an endoluminal view 1120. An articulation marker 1100 and a distal end 1106 of a virtual medical instrument 1105 may be visible in the medical instrument view 1110. The articulation marker 1100 may also be visible in the endoluminal view 1120. In some examples, the articulation marker 1100 may be ring shaped, as shown in FIG. 13B. The articulation marker 1100 may be any other toroidal shape, such as a disk, a donut, or the like.

In some examples, the articulation marker 1100 may be used to assist the control system with determining a suggested radial deployment location for a medical tool, such as a biopsy tool, an observation tool, a treatment tool, or any other medical tool. The virtual medical instrument 1105 may be a virtual representation of the medical instrument 104. For example, as the medical instrument 104 moves through anatomical passageways, the virtual medical instrument 1105 may be shown in the GUI 500 as moving in a corresponding manner to the movement of the medical instrument 104.

At a process 1002, navigation guidance is provided as the medical instrument 104 is navigated through the anatomical passageways to a predetermined deployment location in proximity to the target 108. In some examples, as the medical instrument 104 is navigated through the anatomical passageways, the distal end 1106 of the virtual medical instrument 1105 may be illustrated in the GUI 500 as being navigated to a deployment location near an anatomical target (e.g., the target 108). Navigation may be performed manually by a user with provided navigation guidance, automatically by the control system, or via a combination of both.

At a process 1004, an imaging probe, such as the imaging probe 560, is deployed. At a process 1006, the control system determines if the target 108 is identified in the image data (e.g., ultrasound image data) received from the imaging probe. In some examples, if the target 108 is not identified in the image data, additional navigation guidance may be provided at a process 1008. For example, the control system may highlight the path view 540 of the GUI 500. In other examples, the control system may lock the traversal path of the medical instrument 104 to the preoperatively planned path. Any other navigation guidance discussed above may be additionally or alternatively provided.

If the target 108 is identified in the image data received from the imaging probe, the control system may determine if the imaging probe is extended from the distal end of the medical instrument 104 by a distance that is less than a threshold insertion distance at a process 1010. In some examples, the threshold insertion distance is 15 mm, but may be 10 mm, 11 mm, or any other distance. If the insertion distance of the imaging probe is greater than the threshold distance, additional navigation guidance may be provided at a process 1012. For example, the medical instrument 104 may be inserted further into the patient anatomy to get closer to the target 108. During this insertion, the control system may analyze intraoperative external image data (e.g., fluoroscopic image data) to navigate the medical instrument 104 closer to the target 108.

If the insertion distance of the imaging probe is less than the threshold insertion distance, the articulation marker 1100 may be displayed in the GUI 500 at a process 1014. In some examples, the articulation marker 1100 may be shown in the medical instrument view 1110 and/or the endoluminal view 1120 when the control system receives a user input selecting the "Place" icon 580 (FIG. 5C). In other examples, the articulation marker 1100 may be shown in the medical instrument view 1110 and/or the endoluminal view 1120 when the control system receives a user input selecting the "Done" icon 569 (FIG. 7C).

In some examples, the articulation marker 1100 may be positioned a distance away from a distal end of the medical instrument 104. As shown in FIG. 13A, this distance may be illustrated as a distance D2 away from a distal end 1106 of the virtual medical instrument 1105. The distance D2 may be less than or equal to 15 mm, such as 10 mm, 11 mm, 12 mm, or 15 mm, but may also be any other distance. FIG. 13A shows an illustrative side view of the virtual medical instrument 1105, the articulation marker 1100, and a virtual camera 1122. FIG. 13A further illustrates a field of view 1115, which indicates a view from a distal-looking perspective from the distal end 1106 of the virtual medical instrument 1105. Some or all of the articulation marker 1100 may be visible within the field of view 1115. A field of view 1125 of the virtual camera 1122 is also shown in FIG. 13A. The distal end 1106 and some or all of the articulation marker 1100 may be visible within the field of view 1125. In some examples, as the patient breathes, the medical instrument 104, and therefore the virtual medical instrument 1105, may move (e.g., in the $Y_M$ direction, in the $X_M$ direction, in the $Z_M$ direction, or in any other direction in the medical instrument reference frame). Similar motion of the medical instrument 104 may additionally or alternatively be caused by the patient's cardiac cycle. In some examples, as the virtual medical instrument 1105 moves due to the patient's breathing cycle and/or cardiac cycle, the field of view 1115 and the field of view 1125 may remain unchanged.

For example, the articulation marker 1100 and the virtual camera 1122 may each be virtually "tethered" to the virtual medical instrument 1105. In some examples, the articulation marker 1100 and the virtual camera 1122 are virtually "tethered" to a body portion (e.g., a proximal portion) 1107 of the virtual medical instrument 1105. In such examples, as the body portion 1107 moves (e.g., due to the patient's breathing cycle and/or cardiac cycle), the articulation marker 1100 and the virtual camera 1122 may move in a corresponding manner such that there may be little to no relative movement between the body portion 1107, the articulation marker 1100, and the virtual camera 1122. Because there is little to no relative movement between these components, the articulation marker 1100 may remain within the field of view 1115 and the field of view 1125 as the virtual medical instrument 1105 moves.

In some examples, the control system may differentiate between motion of the medical instrument 104 that is caused by the patient's breathing cycle and/or cardiac cycle and motion of the medical instrument 104 that is caused by articulation of the medical instrument 104. For example, when the distal end of the medical instrument 104 is articulated, the articulation marker 1100 and the virtual camera 1122 may not move. In such examples, there may be relative movement between the distal end 1106, the articulation marker 1100, and the virtual camera 1122. The articulation of the distal end of the medical instrument 104 will be described in further detail below.

In some examples, the articulation marker 1100 and/or the virtual camera 1122 may be "untethered" from the virtual medical instrument 1105. In such examples, there may be relative motion between the virtual medical instrument 1105, the articulation marker 1100, and the virtual camera 1122. As the virtual medical instrument 1105 moves due to the patient's breathing cycle and/or cardiac cycle, the articulation marker 1100 and/or the virtual camera 1122 may remain stationary. In such examples, some or all of the articulation marker 1100 may not be visible in the field of view 1115 and/or the field of view 1125 as the virtual medical instrument 1105 moves due to the patient's breathing cycle and/or cardiac cycle.

In some examples, the field of view 1115 and/or the field of view 1125 may be displayed in the GUI 500, as shown in FIG. 13B. For example, the medical instrument view 1110 may illustrate the field of view 1125 from a distal-looking perspective of the virtual camera 1122. The endoluminal view 1120 may illustrate the field of view 1115 from a distal-looking perspective from the distal end 1106 of the virtual medical instrument 1105.

At an optional process 1016, the insertion distance of the imaging probe may be adjusted. Additionally or alternatively, the distance between the medical instrument 104 and the target 108 may be adjusted. Any adjustments to either of these distances may be illustrated in the GUI 500. For example, as shown in FIG. 13B, the GUI 500 may include a distance icon 1130, an increase icon 1131, and a decrease icon 1132. The distance icon 1130 may illustrate the distance D2 shown in FIG. 13A. The distance D2 may be increased when the control system receives a user input selecting the increase icon 1131. Similarly, the distance D2 may be decreased when the control system receives a user input selecting the decrease icon 1132. The distance D2 may be increased or decreased in increments of 1 mm but may be increased or decreased in increments of 2 mm, 3 mm, or any other desired distance. To reset the distance D2 to a default insertion distance (e.g., 15 mm, 10 mm, or any distance between 15 mm and 10 mm), an icon 1133 may be selected.

At a process 1018, the medical instrument 104 may be articulated, and the imaging probe may be redeployed after the articulation, which will be discussed in greater detail with reference to the examples shown in FIGS. 13B-13D. In some examples, the imaging probe may be retracted into the medical instrument 104 before the medical instrument 104 is articulated, and the imaging probe may be deployed when the articulation is complete. In other examples, the medical instrument 104 may be articulated while the imaging probe is deployed from the medical instrument 104. As discussed above, as the medical instrument 104 is articulated, the virtual medical instrument 1105 may be correspondingly articulated. The articulation of the virtual medical instrument 1105 may be shown in the medical instrument view 1110 and/or the endoluminal view 1120 of the GUI 500 to help the user visualize the articulation of the medical instrument 104.

FIG. 13B illustrates the distal end 1106 of the virtual medical instrument 1105 in a non-articulated configuration. In the non-articulated configuration, the distal end 1106 may be pointed towards a center of the articulation marker 1100. In some examples, the imaging probe may be redeployed when the medical instrument 104 is in the non-articulated configuration.

At a process 1020, the control system determines if the target 108 is identified in the image data received from the imaging probe. If the target 108 is not identified, then the medical instrument 104 may be rearticulated, and the imaging probe may be deployed again. If the imaging probe detects the target 108, an orientation of an articulation indicator on the articulation marker (e.g., the articulation marker 1100) may be confirmed at a process 1022. For example, the medical instrument 104 may be articulated to assist the control system in determining the orientation of the target 108 around one or more of the anatomical passageways. For example, the distal end of the medical instrument 104 may be articulated to different positions/orientations, and the imaging probe may capture intraoperative images at the different positions/orientations. The control system may receive the captured intraoperative images and may use these images to determine the orientation of the target 108. In some examples, the distal end may be articulated when the insertion distance of the imaging probe is 10 mm, 15 mm, or any distance between 10 mm and 15 mm. The distal end may be articulated when the insertion distance of the imaging probe is any other distance, as well.

An example articulation process will be described with reference to FIGS. 13C and 13D. The control system may receive one or more user inputs articulating the medical instrument 104 in various directions (e.g., the X-direction and/or the Y-direction of the instrument coordinate frame). The direction of the articulation may be based on the anticipated location of the target 108, which may be determined from preoperative image data. In some examples, the control system may analyze the images received from the imaging probe to determine the orientation of the target 108.

Figure 13C:
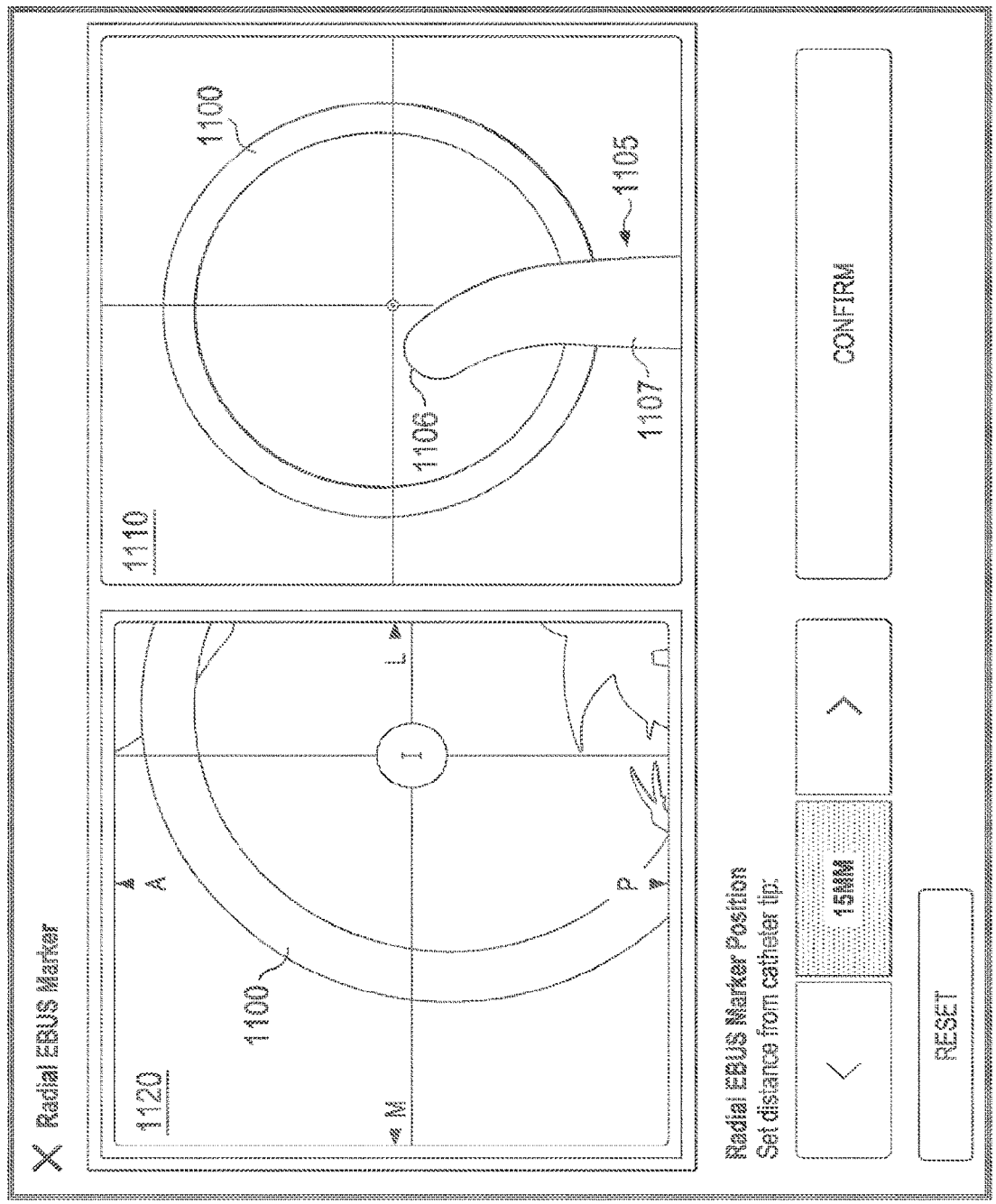

As shown in FIG. 13C, the medical instrument 104 may be articulated toward a "9:00" (i.e., a nine o'clock) orientation. In some examples, when the medical instrument 104 is articulated, the endoluminal view 1120 may shift toward the "9:00" orientation of the articulation marker 1100. Additionally, the medical instrument view 1110 may illustrate the distal end 1106 of the virtual medical instrument 1105 pointing toward the "9:00" orientation of the articulation marker 1100. When the articulation is complete, the imaging probe may be deployed, as discussed above with respect to process 1018. If the imaging probe detects the target 108, then the control system may determine that the target 108 is located at an anatomical position near the distal tip of the imaging probe when the imaging probe is in the "9:00" orientation. In some examples, the imaging probe may be retracted into the medical instrument 104, and the medical instrument 104 may then be articulated toward a "6:00" orientation. The imaging probe may be redeployed. If the imaging probe still detects the target 108, then the control system may determine that the target 108 is located at an anatomical position between the location of the distal tip of the imaging probe when the imaging probe is in the "9:00" orientation and the location of the distal tip of the imaging probe when the imaging probe is in the "6:00" orientation of the anatomical passageway.

The medical instrument 104 may be articulated so that the distal tip of the imaging probe is angled at various orientations between the "9:00" and "6:00" orientations until the image of the target 108 captured by the imaging probe is the clearest image. In some examples, the captured image may increase in clarity (e.g., as determined by a viewer evaluation and/or image processing) as the imaging probe moves closer toward the wall of the anatomical passageway. Based on an evaluation of the relative clarity of the target 108 in the images, the location of the target 108 may be updated based on the location of the target 108 where the image of the target 108 is the clearest image and based on the known orientation of the imaging probe when the clearest image was recorded. The process of updating the target is discussed above at least with respect to process 230 of FIG. 2.

If the imaging probe does not detect the target 108 when the medical instrument 104 is articulated to the "6:00" orientation, the medical instrument 104 may be articulated toward a "12:00" orientation. If the imaging probe detects the target 108 at the "12:00" orientation, then the control system may determine that the target 108 is located near the distal tip of the imaging probe when the distal tip is angled between the "9:00" orientation and the "12:00" orientation. The medical instrument 104 may be articulated so that the distal tip of the imaging probe is angled at various orientations between the "9:00" and "12:00" orientations until the image of the target 108 captured by the imaging probe is the clearest image. Based on an evaluation of the relative clarity of the target 108 in the images, the location of the target 108 may be updated based on the location of the target 108 where the image of the target 108 is the clearest image and based on the known orientation of the imaging probe when the clearest image was recorded. The medical instrument 104 may be articulated so that the distal tip of the imaging probe is angled at any orientation until the image of the target 108 captured by the imaging probe is the clearest image.

In some examples, the medical instrument 104 may be articulated to or beyond a threshold articulation distance. In some examples, the threshold articulation distance may be 2 mm but may be 0.5 mm, 1 mm, 3 mm, or any other distance. The threshold articulation distance may be measured in a direction normal to the longitudinal axis A of the medical instrument 104. The threshold articulation distance may be measured from the longitudinal axis A to the distal end of the medical instrument 104. In some examples, the threshold articulation distance may be set based on the size of the anatomical passageway in which the medical instrument 512 is positioned. For example, the threshold articulation distance may be set such that when the threshold articulation distance is met, the medical instrument 104 is facing the wall of the anatomical passageway at an angle that will allow for a successful biopsy procedure, for example, to be performed. In some examples, when the medical instrument 104 is articulated to or beyond the threshold articulation distance, the imaging probe may be deployed.

If the medical instrument 104 is articulated to or beyond the threshold articulation distance, the control system may confirm the orientation of an articulation indicator on the articulation marker 1100 at a process 1022. For example, FIG. 13D illustrates an articulation indicator 1140 displayed on the articulation marker 1100 in the GUI 500. The medical instrument view 1110 of FIG. 13D shows that the distal end 1106 of the virtual medical instrument 1105 has been articulated further toward the "9:00" orientation than the distal end 1106 shown in the medical instrument view 1110 of FIG. 13C. FIG. 13D also shows that the endoluminal view 1120 has shifted further toward the "9:00" orientation of the articulation marker 1100.

In some examples, the articulation indicator 1140 may be displayed at an orientation of the articulation marker 1100 that corresponds to the direction of articulation of the medical instrument 104. For example, if the medical instrument 104 is articulated to the "9:00" orientation, the articulation indicator 1140 may be displayed at the "9:00" orientation of the articulation marker 1100, as shown in FIG. 13D. In examples when the threshold articulation distance is not met, the articulation indicator 1140 may not be displayed on the articulation marker 1100, as shown in FIG. 11C.

Figure 13D:
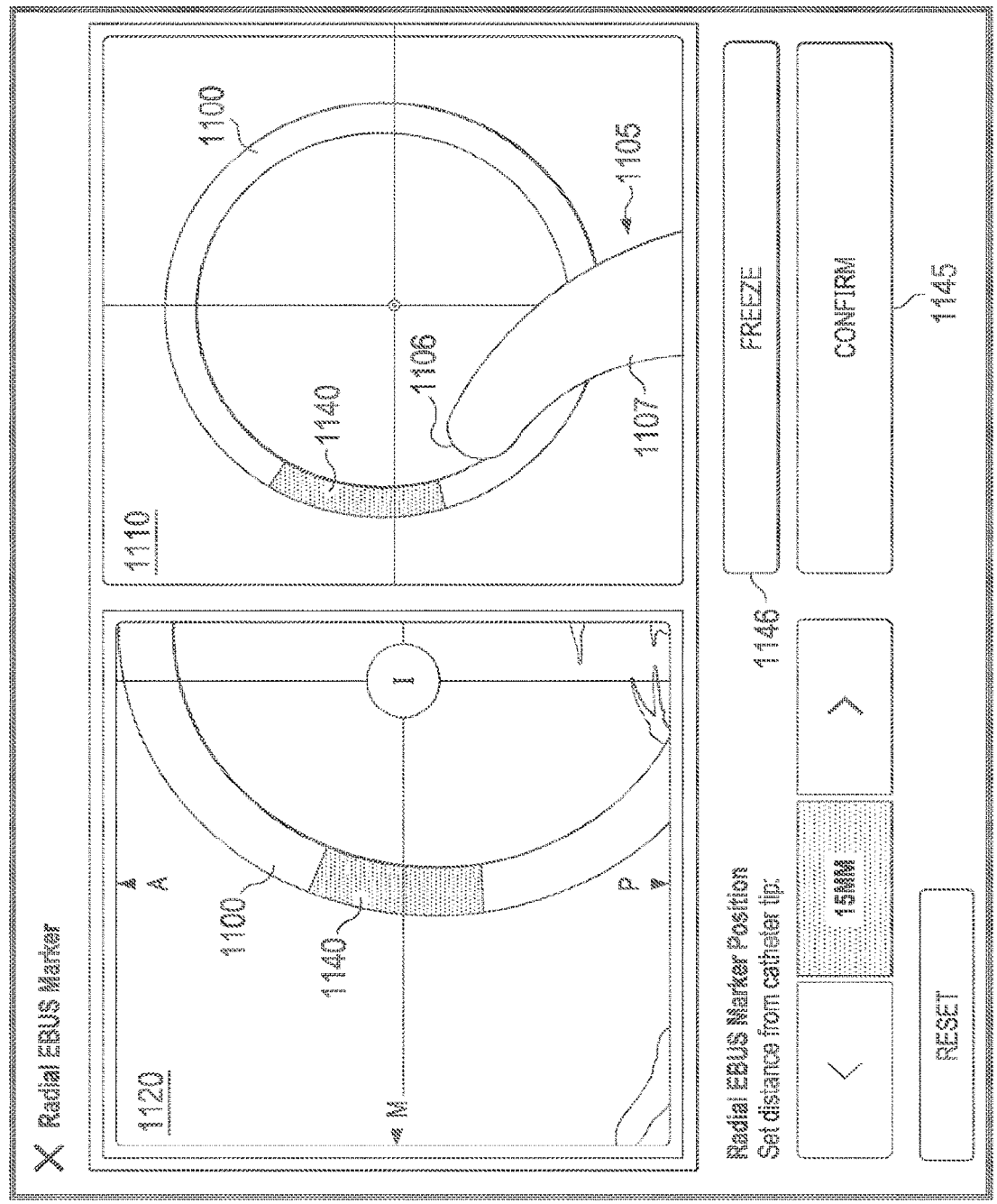

As shown in FIG. 13D, the articulation indicator 1140 may be shown as a highlighted portion of the articulation marker 1100. The articulation indicator 1140 may be any other shape or indicator, such as a wedge, a ray line, a dotted line, a star, a circle, or the like. In some examples, the articulation indicator 1140 may be illustrated as one or more dots in the virtual navigation view 510 that are displayed when the articulation of the medical instrument 104 meets or exceeds the threshold articulation distance. Additionally or alternatively, when the articulation of the medical instrument 104 meets or exceeds the threshold articulation distance, the articulation indicator 1140 may change color.

FIG. 13D further illustrates that the GUI 500 may include a "Confirm" icon 1145 and a "Freeze" icon 1146. In some examples, when the articulation indicator 1140 is displayed (e.g., when the medical instrument 104 is articulated to or beyond the threshold articulation distance) and the imaging probe detects the target 108, the orientation of the articulation indicator (e.g., the articulation indicator 1140) may be confirmed at the process 1022. For example, the articulation indicator 1140 may continue to be displayed even after the medical instrument 104 is articulated in a different direction or returns to the non-articulated configuration. The articulation indicator 1140 may be "frozen" in the medical instrument view 1110 and/or in the endoluminal view 1120 and continually displayed when the control system receives a user input selecting the "Confirm" icon 1145. In some examples, more than one articulation indicator 1140 may be displayed, and more than one articulation indicator 1140 may be "frozen" on the articulation marker 1100. For example, the articulation indicator 1140 may be "frozen" in the medical instrument view 1110 and/or in the endoluminal view 1120 and continually displayed when the control system receives a user input selecting the "Freeze" icon 1146. The medical instrument 104 may be articulated further (e.g., toward the "12:00" orientation). When the medical instrument 104 is articulated to or beyond the threshold articulation distance, a second articulation indicator 1140 may be displayed at the "12:00" orientation of the articulation marker 1100. The second articulation indicator 1140 may be "frozen" in the medical instrument view 1110 and/or in the endoluminal view 1120 and continually displayed when the control system receives a user input selecting the "Freeze" icon 1146.

At a process 1024, the control system may provide instructions to reinsert a medical tool, such as a biopsy tool and/or an endoscopic tool, into the medical instrument 104. The control system may then perform and/or assist with the performance of a medical procedure, such as a biopsy procedure.

In some examples, once the target 108 has been identified based on the articulation of the medical instrument 104, the control system may sever the "tethered" connection between the articulation marker 1100 and the virtual medical instrument 1105. In such examples, the distance D2 may be reduced as the medical instrument 104 is inserted further into the anatomical passageway. The articulation indicator 1140 may act as a target deployment location for a medical tool, such as a biopsy needle or a treatment delivery device, for example. In such examples, when the medical instrument 104 is inserted, the distal end of the medical instrument 104 may be articulated such that the distal end points toward the articulation indicator 1140. The medical tool may be deployed through the wall of the anatomical passageway at a location behind the articulation indicator 1140. In some examples, when the medical instrument 104 is retracted beyond a threshold retraction distance, the articulation marker 1100 may no longer be displayed on the GUI 500.

Figure 12B:
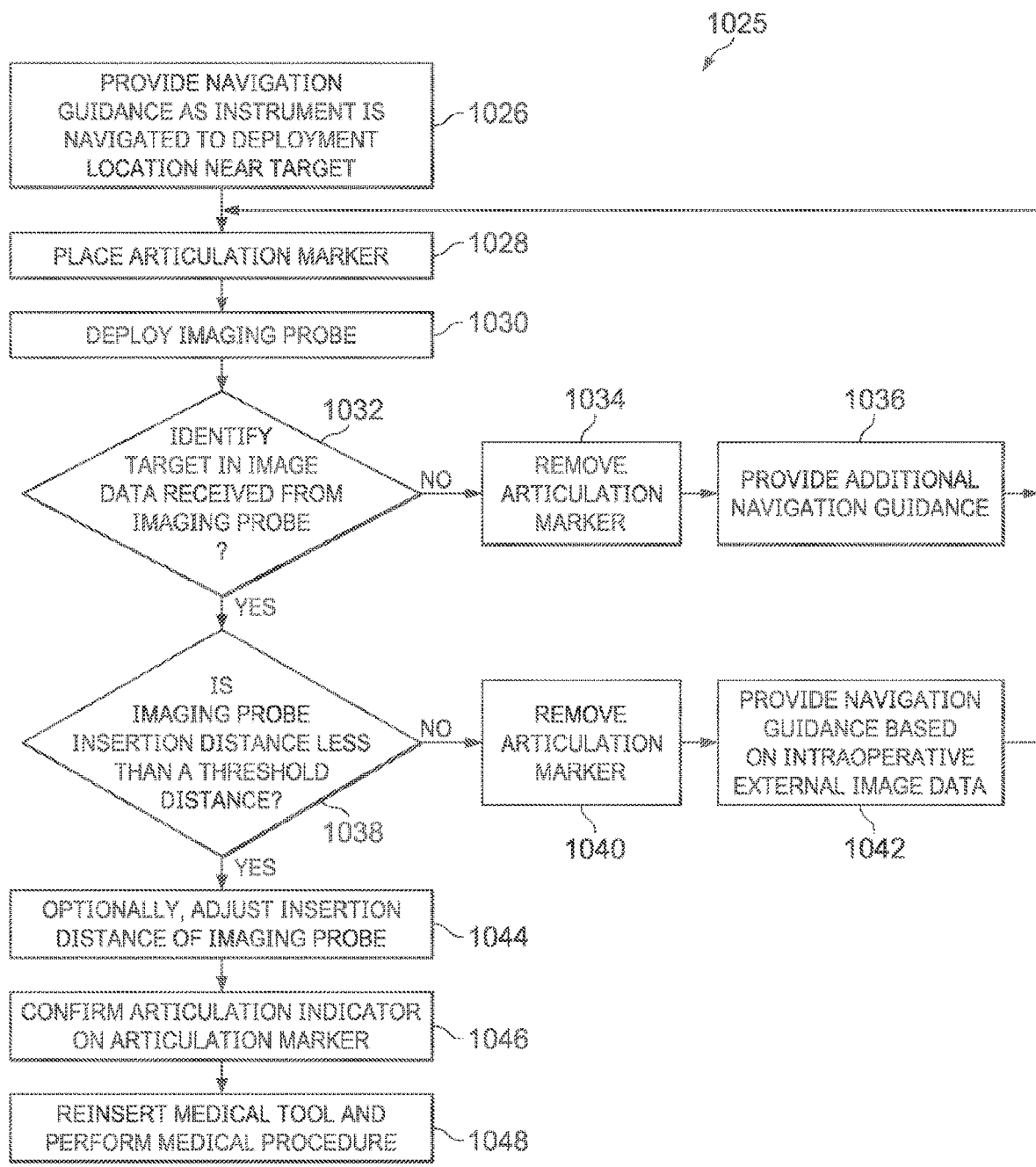
FIG. 12B illustrates an alternative method for placing an articulation marker and confirming an articulation indicator according to some examples.

In some alternative examples, the control system may determine the suggested radial deployment location for the medical tool based on articulation of the medical instrument 104. FIG. 12B illustrates a method 1025 for placing an articulation marker and confirming an articulation indicator according to some examples. The method 1025 is illustrated as a set of operations or processes 1026 through 1048 and is described with continuing reference to FIGS. 12A and 13A-13D. The discussion above with respect to the method 1000 of FIG. 12A similarly applies to the method 1025. However, one or more differences and/or additions are present in the method 1025, which will be discussed below.

At a process 1026, navigation guidance is provided as the medical instrument 104 is navigated through the anatomical passageways to a predetermined deployment location in proximity to the target 108. The process 1026 is similar to the process 1002 of the method 1000.

At a process 1028, the articulation marker 1100 may be displayed in the GUI 500. The process 1028 is similar to the process 1014 of the method 1000. At a process 1030, the imaging probe is deployed. The process 1030 is similar to the process 1004 of the method 1000. At a process 1032, the control system determines if the target 108 is identified in the image data (e.g., ultrasound image data) received from the imaging probe. The process 1032 is similar to the process 1006 of the method 1000. If the target 108 is not identified in the image data, then the articulation marker 1100 may be removed from the GUI 500, for example, at a process 1034. Additional navigation guidance may be provided at a process 1036, which may be similar to the navigation guidance provided at the process 1008 of the method 1000.

If the target 108 is identified in the image data, the control system may determine if the imaging probe is extended from the distal end of the medical instrument 104 by a distance that is less than a threshold distance at a process 1038. The process 1038 is similar to the process 1010 of the method 1000. If the imaging probe is extended from the medical instrument 104 by a distance that is equal to or greater than the threshold insertion distance, the articulation marker 1100 may be removed from the GUI 500, for example, at a process 1040. Additional navigation guidance based on the intraoperative external image data may be provided at a process 1042, which may be similar to the navigation guidance provided at the process 1012 of the method 1000.

If the imaging probe is extended from the medical instrument 104 by a distance that is less than the threshold insertion distance, the insertion distance of the imaging probe may optionally be adjusted at a process 1044. The process 1044 is similar to the process 1016 of the method 1000. At a process 1046, the orientation of an articulation indicator (e.g., the articulation indicator 1140) on the articulation marker (e.g., the articulation marker 1100) may be confirmed. The process 1046 is similar to the process 1022 of the method 1000. At a process 1048, the control system may provide instructions to reinsert a medical tool, such as a biopsy tool, into the medical instrument 104. The control system may then perform and/or assist with the performance of a medical procedure, such as a biopsy procedure.

In some examples, the components discussed above may be part of a robotic-assisted system as described in further detail below. The robotic-assisted system may be suitable for use in, for example, surgical, robotic-assisted surgical, diagnostic, therapeutic, or biopsy procedures. While some examples are provided herein with respect to such procedures, any reference to medical or surgical instruments and medical or surgical methods is non-limiting. The systems, instruments, and methods described herein may be used for animals, human cadavers, animal cadavers, portions of human or animal anatomy, non-surgical diagnosis, as well as for industrial systems and general robotic, general robotic-assisted, or robotic medical systems.

Figure 14:
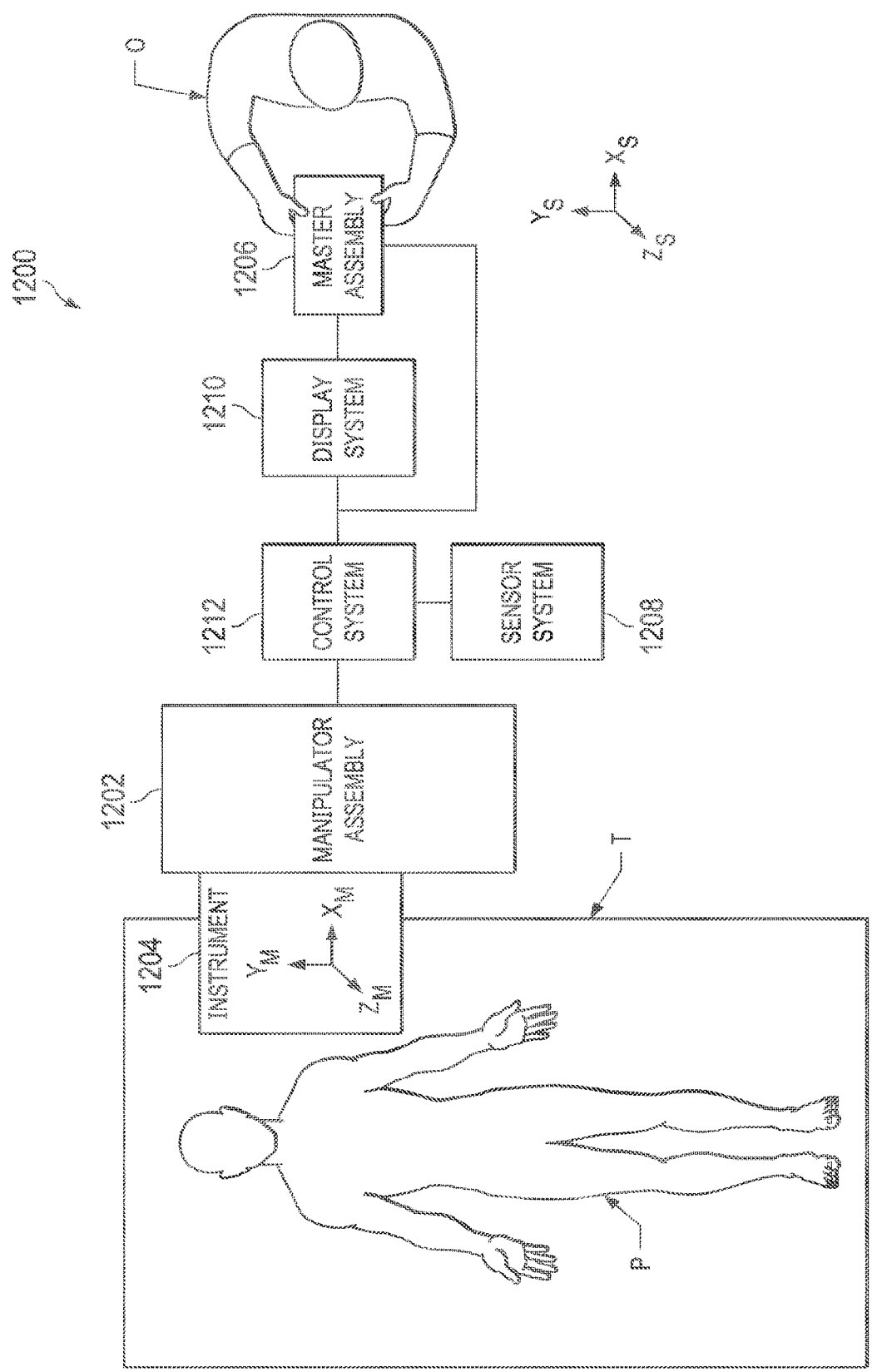
FIG. 14 is a simplified diagram of a robotic-assisted medical system according to some examples.

As shown in FIG. 14, a medical system 1200 generally includes a manipulator assembly 1202 for operating a medical instrument 1204 (e.g., the medical instrument 104) in performing various procedures on a patient P positioned on a table T. The manipulator assembly 1202 may be robotic-assisted, non-robotic-assisted, or a hybrid robotic-assisted and non-robotic-assisted assembly with select degrees of freedom of motion that may be motorized and/or robotic-assisted and select degrees of freedom of motion that may be non-motorized and/or non-robotic-assisted. The medical system 1200 may further include a master assembly 1206, which generally includes one or more control devices for controlling manipulator assembly 1202. Manipulator assembly 1202 supports medical instrument 1204 and may optionally include a plurality of actuators or motors that drive inputs on medical instrument 1204 in response to commands from a control system 1212. The actuators may optionally include drive systems that when coupled to medical instrument 1204 may advance medical instrument 1204 into a naturally or surgically created anatomic orifice.

Medical system 1200 also includes a display system 1210 for displaying an image or representation of the surgical site and medical instrument 1204 generated by sub-systems of sensor system 1208. Display system 1210 and master assembly 1206 may be oriented so operator O can control medical instrument 1204 and master assembly 1206 with the perception of telepresence. Additional information regarding the medical system 1200 and the medical instrument 1204 may be found in International Application Publication No. WO 2018/195216, filed on Apr. 18, 2018, entitled "Graphical User Interface for Monitoring an Image-Guided Procedure," which is incorporated by reference herein in its entirety.

In some examples, medical instrument 1204 may include components of an imaging system (discussed in more detail below), which may include an imaging scope assembly or imaging instrument that records a concurrent or real-time image of a surgical site and provides the image to the operator or operator O through one or more displays of medical system 1200, such as one or more displays of display system 1210. The concurrent image may be, for example, a two or three-dimensional image captured by an imaging instrument positioned within the surgical site. In some examples, the imaging system includes endoscopic imaging instrument components that may be integrally or removably coupled to medical instrument 1204. However, in some examples, a separate endoscope, attached to a separate manipulator assembly may be used with medical instrument 1204 to image the surgical site. In some examples, as described in detail below, the imaging instrument alone or in combination with other components of the medical instrument 1204 may include one or more mechanisms for cleaning one or more lenses of the imaging instrument when the one or more lenses become partially and/or fully obscured by fluids and/or other materials encountered by the distal end of the imaging instrument. In some examples, the one or more cleaning mechanisms may optionally include an air and/or other gas delivery system that is usable to emit a puff of air and/or other gasses to blow the one or more lenses clean. Examples of the one or more cleaning mechanisms are discussed in more detail in International Application Publication No. WO/2016/025465, filed on Aug. 11, 2016, entitled "Systems and Methods for Cleaning an Endoscopic Instrument"; U.S. patent application Ser. No. 15/508,923, filed on Mar. 5, 2017, entitled "Devices, Systems, and Methods Using Mating Catheter Tips and Tools"; and U.S. patent application Ser. No. 15/503,589, filed Feb. 13, 2017, entitled "Systems and Methods for Cleaning an Endoscopic Instrument." each of which is incorporated by reference herein in its entirety. The imaging system may be implemented as hardware, firmware, software or a combination thereof which interact with or are otherwise executed by one or more computer processors, which may include the processors of the control system 1212.

Control system 1212 includes at least one memory and at least one computer processor (not shown) for effecting control between medical instrument 1204, master assembly 1206, sensor system 1208, and display system 1210. Control system 1212 also includes programmed instructions (e.g., a non-transitory machine-readable medium storing the instructions) to implement some or all of the methods described in accordance with aspects disclosed herein, including instructions for providing information to display system 1210.

The singular forms "a", "an", and "the" are intended to include the plural forms as well, unless the context indicates otherwise. And the terms "comprises," "comprising," "includes," "has," and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components. The auxiliary verb "may" likewise implies that a feature, step, operation, element, or component is optional.

In the description, specific details have been set forth describing some embodiments. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

Elements described in detail with reference to one example, implementation, or application optionally may be included, whenever practical, in other examples, implementations, or applications in which they are not specifically shown or described. For example, if an element is described in detail with reference to one example and is not described with reference to a second example, the element may nevertheless be claimed as included in the second example. Thus, to avoid unnecessary repetition in the following description, one or more elements shown and described in association with one example, implementation, or application may be incorporated into other examples, implementations, or aspects unless specifically described otherwise, unless the one or more elements would make an example or implementation non-functional, or unless two or more of the elements provide conflicting functions.

Any alterations and further modifications to the described devices, instruments, methods, and any further application of the principles of the present disclosure are fully contemplated as would normally occur to one skilled in the art to which the disclosure relates. In addition, dimensions provided herein are for specific examples and it is contemplated that different sizes, dimensions, and/or ratios may be utilized to implement the concepts of the present disclosure. To avoid needless descriptive repetition, one or more components or actions described in accordance with one illustrative embodiment can be used or omitted as applicable from other illustrative embodiments. For the sake of brevity, the numerous iterations of these combinations will not be described separately. For simplicity, in some instances the same reference numbers are used throughout the drawings to refer to the same or like parts.

The systems and methods described herein may be suited for navigation and treatment of anatomic tissues, via natural or surgically created connected passageways, in any of a variety of anatomic systems, including the lung, colon, the intestines, the kidneys and kidney calices, the brain, the heart, the circulatory system including vasculature, and/or the like. Although some of the examples described herein refer to surgical procedures or instruments, or medical procedures and medical instruments, the techniques disclosed apply to non-medical procedures and non-medical instruments. For example, the instruments, systems, and methods described herein may be used for non-medical purposes including industrial uses, general robotic uses, and sensing or manipulating non-tissue work pieces. Other example applications involve cosmetic improvements, imaging of human or animal anatomy, gathering data from human or animal anatomy, and training medical or non-medical personnel. Additional example applications include use for procedures on tissue removed from human or animal anatomies (without return to a human or animal anatomy), and performing procedures on human or animal cadavers. Further, these techniques can also be used for surgical and nonsurgical medical treatment or diagnosis procedures.

Further, although some of the examples presented in this disclosure discuss robotic-assisted systems or remotely operable systems, the techniques disclosed are also applicable to computer-assisted systems that are directly and manually moved by operators, in part or in whole.

Additionally, one or more elements in examples of this disclosure may be implemented in software to execute on a processor of a computer system such as a control processing system. When implemented in software, the elements of the examples of the present disclosure are essentially the code segments to perform the necessary tasks. The program or code segments can be stored in a processor readable storage medium (e.g., a non-transitory storage medium) or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit, a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet, etc. Any of a wide variety of centralized or distributed data processing architectures may be employed. Programmed instructions may be implemented as a number of separate programs or subroutines, or they may be integrated into a number of other aspects of the systems described herein. In some examples, the control system may support wireless communication protocols such as Bluetooth, Infrared Data Association (IrDA), HomeRF, IEEE 802.11, Digital Enhanced Cordless Telecommunications (DECT), ultra-wideband (UWB), ZigBee, and Wireless Telemetry.

A computer is a machine that follows programmed instructions to perform mathematical or logical functions on input information to produce processed output information. A computer includes a logic unit that performs the mathematical or logical functions, and memory that stores the programmed instructions, the input information, and the output information. The term "computer" and similar terms, such as "processor" or "controller" or "control system", are analogous.

Note that the processes and displays presented may not inherently be related to any particular computer or other apparatus, and various systems may be used with programs in accordance with the teachings herein. The required structure for a variety of the systems discussed above will appear as elements in the claims. In addition, the examples of the present disclosure are not described with reference to any particular programming language. It will be appreciated that a variety of programming languages may be used to implement the teachings of the present disclosure as described herein.

While certain example examples of the present disclosure have been described and shown in the accompanying drawings, it is to be understood that such examples are merely illustrative of and not restrictive to the broad disclosed concepts, and that the examples of the present disclosure not be limited to the specific constructions and arrangements shown and described, since various other modifications may occur to those ordinarily skilled in the art.

What is claimed is:

1. A medical system comprising:
    a display system;
    an elongate device;
    an imaging probe configured to extend within the elongate device; and
    a control system communicatively coupled to the display system, the control system configured to:
        determine a first target location in a model of a patient anatomy, the first target location based on imaging data received from an external imaging system;
        display a graphical user interface via the display system, the graphical user interface including a virtual navigation view;
        receive imaging data from the imaging probe;
        determine an updated target location based on the imaging data from the imaging probe, the updated target location being different from the first target location;
        determine a position of a distal end of the elongate device; and
        display a graphical marker in the virtual navigation view indicating a direction to steer the elongate device from the position of the distal end of the elongate device to the updated target location.

2. The medical system of claim 1, wherein the graphical marker includes one or more arrows.

3. The medical system of claim 1, wherein the graphical marker includes a plurality of targets positioned along a path extending between the position of the distal end of the elongate device and the updated target location.

4. The medical system of claim 1, wherein the graphical marker illustrates an optimal path from the position of the distal end of the elongate device to the updated target location.

5. The medical system of claim 4, wherein the optimal path illustrates an optimal pose of the elongate device.

6. The medical system of claim 1, wherein the control system is further configured to provide audible instructions indicating the direction to steer the elongate device from the position of the distal end of the elongate device to the updated target location.

7. The medical system of claim 1, wherein the control system is further configured to display an image of the elongate device in the virtual navigation view.

8. The medical system of claim 1, wherein the control system is further configured to receive instructions to navigate the elongate device to the updated target location based on the direction indicated by the graphical marker.

9. The medical system of claim 1, wherein the control system is further configured to display an image of a target at the updated target location in the virtual navigation view.

10. The medical system of claim 9, wherein the elongate device is positioned within an anatomical passageway, wherein the control system is further configured to display an image of the anatomical passageway in the virtual navigation view, and wherein the image of the target is displayed outside of the image of the anatomical passageway in the virtual navigation view.

11. The medical system of claim 1, wherein the external imaging system is a fluoroscopic imaging system.

12. The medical system of claim 1, wherein an orientation of the imaging probe is adjustable based on one or more user inputs received by the control system.

13. The medical system of claim 1, wherein the imaging data from the imaging probe comprises a plurality of images, wherein each image of the plurality of images corresponds to a respective orientation of the imaging probe.

14. The medical system of claim 13, wherein the control system is further configured to determine a clarity of each image of the plurality of images.

15. The medical system of claim 14, wherein determining the updated target location comprises:

evaluating the clarity of each image to identify a clearest image; and determining the orientation of the imaging probe corresponding to the clearest image.

16. The medical system of claim 1, wherein the virtual navigation view includes a representation of the imaging probe, and wherein an orientation of the representation of the imaging probe is adjustable in response to one or more user inputs received by the control system.

17. The medical system of claim 1, wherein the control system is further configured to receive shape data from a shape sensor disposed along a length of the elongate device.

18. The medical system of claim 17, wherein the shape data is received in real-time.

19. The medical system of claim 17, wherein the control system is further configured to determine a position of the elongate device based on the shape data.

20. The medical system of claim 1, wherein the imaging data from the imaging probe comprises at least one or more ultrasound images.

* * * * *